(12) United States Patent
Zhang et al.

(10) Patent No.: US 10,461,986 B2
(45) Date of Patent: Oct. 29, 2019

(54) DATA TRANSMISSION METHOD, APPARATUS, AND SYSTEM

(71) Applicant: HUAWEI TECHNOLOGIES CO., LTD., Shenzhen, Guangdong (CN)

(72) Inventors: Fengwei Zhang, Hangzhou (CN); Weifeng Shen, Hangzhou (CN); Qiang Feng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 15/700,174

(22) Filed: Sep. 10, 2017

(65) Prior Publication Data

US 2017/0373915 A1 Dec. 28, 2017

Related U.S. Application Data

(63) Continuation of application No. PCT/CN2015/075316, filed on Mar. 27, 2015.

(51) Int. Cl.
*H04L 29/06* (2006.01)

(52) U.S. Cl.
CPC ...... *H04L 29/06136* (2013.01); *H04L 69/163* (2013.01); *H04L 69/166* (2013.01)

(58) Field of Classification Search
None
See application file for complete search history.

(56) References Cited

U.S. PATENT DOCUMENTS

| 7,054,317 B1 | 5/2006 | Jung et al. |
| 7,352,700 B2 | 4/2008 | Chan et al. |

(Continued)

FOREIGN PATENT DOCUMENTS

| CN | 1842080 A | 10/2006 |
| CN | 101534573 A | 9/2009 |

(Continued)

OTHER PUBLICATIONS

Mohammad Alizadeh et al. Data Center TCP (DCTCP), SIGCOMM' 10, Aug. 30-Sep. 3, 2010. total 12 pages.

(Continued)

*Primary Examiner* — Diane L Lo
(74) *Attorney, Agent, or Firm* — Kilpatrick Townsend & Stockton LLP

(57) ABSTRACT

A data transmission method in software-defined networking (SDN) environment using transmission control protocol (TCP). An application server sends a transmission resource allocation request to a controller. The request carries an address of a sending device and an address of a receiving device. The controller determines a first transmission path and a second transmission path between the sending device and the receiving device according to the request. The first transmission path is used by the sending device to transmit data to the receiving device, and the second transmission path is used by the receiving device to transmit an acknowledgment to the sending device. The controller sends a transmission resource allocation response to the application server. The application server determines, according to the response, an initial value of a transmit window for transmitting data. The sending device transmits the data to the receiving device according to the transmit window.

17 Claims, 7 Drawing Sheets

(56) References Cited

U.S. PATENT DOCUMENTS

| | | | |
|---|---|---|---|
| 2003/0117974 A1* | 6/2003 | Kang | H04L 1/1671 370/328 |
| 2005/0013245 A1 | 1/2005 | Sreemanthula et al. | |
| 2006/0291435 A1* | 12/2006 | Hirsimaki | H04L 29/06 370/338 |
| 2012/0137019 A1 | 5/2012 | Kotecha et al. | |
| 2014/0173018 A1 | 6/2014 | Westphal et al. | |
| 2015/0326660 A1* | 11/2015 | Satterlee | H04L 67/14 709/203 |
| 2016/0014829 A1 | 1/2016 | Hasegawa et al. | |

FOREIGN PATENT DOCUMENTS

| | | |
|---|---|---|
| CN | 101645765 A | 2/2010 |
| CN | 101982951 A | 3/2011 |
| CN | 102333209 A | 1/2012 |
| CN | 103051555 A | 4/2013 |
| CN | 103929370 A | 7/2014 |
| CN | 104518973 A | 4/2015 |
| KR | 20150116094 A | 10/2015 |
| WO | 2014133066 A1 | 9/2014 |

OTHER PUBLICATIONS

Alex C. Snoeren, Lecture 15:Datacenter TCP, CSE 222A: Computer Communication Networks, . DCTCP-lecture. 2010. total 31 pages.

Xu Jianhua et al. Research to Flow Control Mechanism for TCP incast based on OpenFlow. 2012. total 8 pages. with English partial translation.

Monia Ghobadi et al. Rethinking End-to-End Congestion Control in Software-Defined Networks. Hotnets '12, Oct. 29-30, 2012. total 6 pages.

Chen Yu et al. TCP Performance Enhancing Proxy Based on SCPS-TP. Computer Engineering, Supplementary Issue, vol. 37. Dec. 2011. total 3 pages. with English Abstract.

V. Paxson et al. Computing TCP's Retransmission Timer, Network Working Group, RFC2988. Nov. 2000. total 8 pages.

J. Elliott. Request for Comments Summary, RFC Nos. 1900-1999. Network Working Group, Request for Comments: 1999, Category: Informational. Jan. 1997. total 20 pages.

Joao Taveira Araujo et al. Software-defined network support for transport resilience, IEEE 2014. total 8 pages. XP32608841A.

Marcus Sandri et al. On the Benefits of Using Multipath TCP and Openflow in Shared Bottlenecks, 2015 IEEE 29th International Conference on Advanced Information Networking and Applications. 2015. pp. 9-16.XP32771816A.

* cited by examiner

DATA TRANSMISSION METHOD, APPARATUS, AND SYSTEM

CROSS-REFERENCE TO RELATED APPLICATIONS

This application is a continuation of International Application No. PCT/CN2015/075316, filed on Mar. 27, 2015, the disclosure of which is hereby incorporated by reference in its entirety.

TECHNICAL FIELD

Embodiments of the present disclosure relate to the communications field, and in particular, to a data transmission method, apparatus, and system.

BACKGROUND

The Transmission Control Protocol (TCP) is a connection-oriented, reliable, and byte-stream-based transport layer communication protocol. A TCP layer is an intermediate layer located above an Internet Protocol (IP) layer and below an application layer, and the TCP layer provides reliable pipe-like connections between application layers of different hosts. The application layer sends, to the TCP layer, a data stream for inter-network transmission. The TCP layer then divides the data stream into packet segments with proper lengths. Subsequently, the TCP layer transmits the packet segments to the IP layer, and the packet segments are transmitted to a TCP layer of a receive end entity using a network.

The TCP is a sliding window protocol. That is, how much data that can be sent at a moment by a transmit end connected by the TCP is controlled by a sliding window (transmit window). Size of the sliding window may be jointly determined by a receive window (Rwnd) and a congestion window (Cwnd). A smaller value between sizes of the Rwnd and the Cwnd is taken as the size of the sliding window. The Rwnd indicates a remaining space in a TCP protocol buffer at a receive end. A transmit end needs to ensure that data sent by the transmit end does not exceed the remaining space, so as to prevent a buffer overflow. This window is used by the receive end to limit a flow. The Cwnd is a window used by the transmit end to control a flow.

A TCP device transmits data in various networks. Because the TCP device does not know data transmission features of a network in which the TCP device runs, the TCP device needs to keep increasing or decreasing the size of the sliding window to adapt to changes of network status, and detect the network status. To control a network flow, the TCP uses four control mechanisms: slow start, congestion avoidance, fast retransmit, and fast recovery.

After a TCP connection is established, if network capabilities are unknown, a TCP transmit end first tentatively sends one packet. Size of the Cwnd is one packet. After receiving an acknowledgment (ACK), the TCP transmit end sends two more packets. After ACKs of the two packets are received, the Cwnd size increases to four packets. In this way, each time an ACK of one packet is received, the Cwnd size increases by one packet.

In a conventional network, because routing paths and network statuses between two communication nodes change constantly, algorithms in the TCP protocol, which are used by a single node to detect network status, evolve constantly. Due to inflexibility of a network, bandwidths are not fully utilized; and because of contentions between TCP transmission nodes, throughputs are all at low levels.

In some distributed computing applications, data needs to be efficiently transmitted between two computing nodes within a certain amount of time. Therefore, TCP-based optimization becomes increasingly important. Software-defined networking (SDN) provides application-based management and control capabilities, such that SDN-based TCP optimization becomes increasingly important.

SUMMARY

In view of this, embodiments of the present disclosure provide a data transmission method, apparatus, and system, so as to optimize TCP data transmission in an SDN network.

According to a first aspect, an embodiment of the present disclosure provides a data transmission method, applied to software-defined networking SDN, where a controller in the SDN network is connected to a switching device through a southbound interface and is connected to an application server through a northbound interface, at least one application runs on the application server, and when the application server determines that currently data needs to be transmitted from a sending device to a receiving device using the Transmission Control Protocol TCP, the method includes:

receiving, by the controller, a TCP transmission resource allocation request from the application server, where the TCP transmission resource allocation request carries an address of the sending device and an address of the receiving device;

determining, by the controller, a first transmission path and a second transmission path according to the TCP transmission resource allocation request, where the first transmission path is used by the sending device to transmit the data to the receiving device, and the second transmission path is used by the receiving device to transmit a TCP acknowledgment to the sending device; and sending, by the controller, a TCP transmission resource allocation response message to the application server, where the TCP transmission resource allocation response message includes bandwidth information of the first transmission path and a TCP round-trip transmission delay, the TCP round-trip transmission delay indicates a pre-estimated time difference between a time T1 at which the sending device sends each data packet through the first transmission path and a time T2 at which the sending device receives a TCP acknowledgment of each data packet through the second transmission path, and the bandwidth information of the first transmission path and the TCP round-trip transmission delay are used to determine an initial value of a transmit window for TCP data transmission between the sending device and the receiving device.

With reference to the first aspect, in a first possible implementation manner, before the sending, by the controller, a TCP transmission resource allocation response message to the application server, the method further includes: obtaining, by the controller, a transmission delay of the first transmission path and a transmission delay of the second transmission path, and determining the TCP round-trip transmission delay according to the transmission delay of the first transmission path and the transmission delay of the second transmission path, where the TCP round-trip transmission delay is positively correlated with a sum of the transmission delay of the first transmission path and the transmission delay of the second transmission path.

With reference to the first aspect or the foregoing possible implementation manner, in a second possible implementation manner, before the sending, by the controller, a TCP transmission resource allocation response message to the application server, the method further includes: determining, by the controller, a packet loss rate of the first transmission path, and in this case, the TCP transmission resource allocation response message further includes the packet loss rate of the first transmission path.

With reference to any one of the first aspect or the foregoing possible implementation manners, in a third possible implementation manner, the TCP transmission resource allocation request further carries maximum transmission unit (MTU) value information, and the MTU value information includes a maximum value for an MTU value of the sending device and a maximum value for an MTU value of the receiving device;

the method further includes: determining, by the controller according to the MTU value information in the TCP transmission resource allocation request, an MTU value used by the first transmission path to transmit the data, where the MTU value used by the first transmission path to transmit the data is not greater than a smaller value between the maximum value for the MTU value of the sending device and the maximum value for the MTU value of the receiving device; and in this case, the TCP transmission resource allocation response message further includes the MTU value used by the first transmission path to transmit the data.

With reference to any one of the first aspect or the foregoing possible implementation manners, in a fourth possible implementation manner, the TCP transmission resource allocation request further includes a bandwidth required for transmitting the data; and the determining, by the controller, a first transmission path according to the TCP transmission resource allocation request includes: selecting, according to a network topology of the switching device and from paths between the sending device and the receiving device, a path whose remaining bandwidth resources meet a requirement for transmitting the data as the first transmission path.

With reference to any one of the first aspect or the foregoing possible implementation manners, in a fifth possible implementation manner, the selecting, by the controller from paths between the sending device and the receiving device, a path whose remaining bandwidth resources meet a requirement for transmitting the data as the first transmission path includes: selecting, by the controller, from all paths whose remaining bandwidth resources meet the requirement for transmitting the data between the sending device and the receiving device, a path whose remaining bandwidth resources are the fewest or a path whose hop count is the smallest as the first transmission path.

According to a second aspect, an embodiment of the present disclosure provides a controller, applied to software-defined networking SDN, where the controller is connected to a switching device through a southbound interface and is connected to an application server through a northbound interface, and the controller includes: a processor, a memory, a bus, and a communications interface, where the memory is configured to store an instruction executable by a computing device, the processor and the memory are connected through the bus, and when the computing device operates, the processor executes the instruction that is executable by the computing device and that is stored in the memory, to enable the computing device to perform the method according to any one of the first aspect or the possible implementation manners of the first aspect.

According to a third aspect, an embodiment of the present disclosure provides a data transmission method, applied to software-defined networking SDN, where a controller in the SDN network is connected to a switching device through a southbound interface and is connected to an application server through a northbound interface, at least one application runs on the application server, and when the application server determines that currently data needs to be transmitted from a sending device to a receiving device using the TCP protocol, the method includes:

sending, by the application server, a TCP transmission resource allocation request to the controller, where the TCP transmission resource allocation request carries an address of the sending device and an address of the receiving device;

receiving, by the application server, a TCP transmission resource allocation response message from the controller, where the TCP transmission resource allocation response message includes a bandwidth of the first transmission path and a TCP round-trip transmission delay, the TCP round-trip transmission delay indicates a pre-estimated time difference between a time T1 at which the sending device sends each data packet through the first transmission path and a time T2 at which the sending device receives a TCP acknowledgment of each data packet through the second transmission path, the first transmission path is used by the sending device to transmit the data to the receiving device, and the second transmission path is used by the receiving device to transmit a TCP acknowledgment to the sending device; and determining, by the application server according to the bandwidth of the first transmission path and the TCP round-trip transmission delay, an initial value of a transmit window for TCP data transmission between the sending device and the receiving device.

With reference to the third aspect, in a first possible implementation manner, the initial value of the transmit window is positively correlated with the bandwidth of the first transmission path and the TCP round-trip transmission delay separately.

With reference to the third aspect or the foregoing possible implementation manner, in a second possible implementation manner, the TCP transmission resource allocation response message further carries a packet loss rate of the first transmission path; and the method further includes: determining, by the application server, the initial value of the transmit window according to the packet loss rate, where the initial value of the transmit window is negatively correlated with the packet loss rate.

With reference to any one of the third aspect or the foregoing possible implementation manners, in a third possible implementation manner, the method further includes: determining, by the application server, an initial value of a receive window of the receiving device according to the bandwidth of the first transmission path and the TCP round-trip transmission delay, where the initial value of the receive window is positively correlated with the bandwidth of the first transmission path and the TCP round-trip transmission delay separately.

With reference to any one of the third aspect or the foregoing possible implementation manners, in a fourth possible implementation manner, the method further includes: determining, by the application server, an initial value of a receive window of the receiving device according to the bandwidth of the first transmission path, the TCP round-trip transmission delay, and the packet loss rate, where the initial value of the receive window is positively correlated with the bandwidth of the first transmission path and the TCP round-trip transmission delay separately and is negatively correlated with the packet loss rate.

With reference to any one of the third aspect or the foregoing possible implementation manners, in a fifth possible implementation manner, the method further includes: sending, by the application server, a transmit window setting message to the sending device, where the transmit window setting message includes the initial value of the transmit window.

With reference to any one of the third aspect or the foregoing possible implementation manners, in a sixth possible implementation manner, the method further includes: sending, by the application server, a receive window setting message to the receiving device, where the receive window setting message includes the initial value of the receive window.

With reference to any one of the third aspect or the foregoing possible implementation manners, in a seventh possible implementation manner, the TCP transmission resource allocation request further carries maximum transmission unit (MTU) value information, and the MTU value information is used to indicate a maximum value for an MTU value of the sending device and a maximum value for an MTU value of the receiving device;

the TCP transmission resource allocation response message further includes an MTU value used by the first transmission path to transmit the data; and the method further includes: determining, by the application server, that the MTU values of the sending device and the receiving device are the MTU value used by the first transmission path to transmit the data.

With reference to any one of the third aspect or the foregoing possible implementation manners, in an eighth possible implementation manner, the method further includes: sending, by the application server, an MTU setting message to the sending device and the receiving device, where the MTU setting message includes the MTU value for the first transmission path.

With reference to any one of the third aspect or the possible implementation manners, in a ninth possible implementation manner, the method further includes: determining, by the application server, a retransmission timeout interval of the sending device according to the TCP round-trip transmission delay, where the retransmission timeout interval is positively correlated with the TCP round-trip transmission delay.

With reference to any one of the third aspect or the foregoing possible implementation manners, in a tenth possible implementation manner, the method further includes: sending, by the application server, a retransmission timeout interval setting message to the sending device, where the retransmission timeout interval setting message includes the retransmission timeout interval.

With reference to any one of the third aspect or the possible implementation manners, in an eleventh possible implementation manner, the method further includes: determining, by the application server, an acknowledgment wait time of the receiving device according to the TCP round-trip transmission delay, where the acknowledgment wait time is positively correlated with the TCP round-trip transmission delay.

With reference to any one of the third aspect or the foregoing possible implementation manners, in a twelfth possible implementation manner, the method further includes: sending, by the application server, an acknowledgment wait time setting message to the receiving device, where the acknowledgment wait time setting message includes the acknowledgment wait time.

According to a fourth aspect, an embodiment of the present disclosure provides an application server, applied to software-defined networking (SDN), where a controller of the SDN is connected to a switching device through a southbound interface and is connected to the application server through a northbound interface, and the application server includes: a processor, a memory, a bus, and a communications interface, where the memory is configured to store an instruction executable by a computing device, the processor and the memory are connected through the bus, and when the computing device operates, the processor executes the instruction that is executable by the computing device and that is stored in the memory, to enable the computing device to perform the method according to any one of the third aspect or the possible implementation manners of the third aspect.

According to a fifth aspect, an embodiment of the present disclosure provides a data transmission method, applied to software-defined networking (SDN), where a controller in the SDN network is connected to a switching device through a southbound interface and is connected to an application server through a northbound interface, at least one application runs on the application server, and when the application server determines that currently data needs to be transmitted from a sending device to a receiving device using the TCP protocol, the method includes:

receiving, by the sending device, a transmit window setting message, where the transmit window setting message includes an initial value of a transmit window of the sending device; and performing, by the sending device, TCP data transmission according to the initial value of the transmit window.

With reference to the fifth aspect, in a first possible implementation manner, the sending device is further configured to: receive a maximum transmission unit (MTU) setting message, where the MTU setting message includes an MTU value of the sending device during data transmission; and set an MTU value of the sending device according to an indication of the MTU setting message.

With reference to the fifth aspect or the foregoing possible implementation manner, in a second possible implementation manner, the sending device is further configured to: receive a retransmission timeout interval setting message, where the retransmission timeout interval setting message includes a retransmission timeout interval value used by the sending device during TCP data transmission; and set the retransmission timeout interval value of the sending device according to an indication of the retransmission timeout interval setting message.

According to a sixth aspect, an embodiment of the present disclosure provides a computing device, applied to software-defined networking (SDN), where a controller of the SDN is connected to a switching device through a southbound interface and is connected to an application server through a northbound interface, the application server is configured to control data to be sent from the computing device to a receiving device, and the computing device includes: a processor, a memory, a bus, and a communications interface, where the memory is configured to store an instruction executable by the computing device, the processor and the memory are connected through the bus, and when the computing device operates, the processor executes the instruction that is executable by the computing device and that is stored in the memory, to enable the computing device to perform the method according to any one of the fifth aspect or the foregoing possible implementation manners of the fifth aspect.

According to a seventh aspect, an embodiment of the present disclosure provides a data transmission apparatus, applied to software-defined networking (SDN), where a controller of the SDN is connected to a switching device through a southbound interface and is connected to an application server through a northbound interface, the application server is configured to control data to be sent from the apparatus to a receiving device, and the data transmission apparatus includes:

a receiving unit, configured to receive a transmit window setting message, where the transmit window setting message includes an initial value of a transmit window of the data transmission device; and a sending unit, configured to perform TCP data transmission according to the initial value of the transmit window.

With reference to the seventh aspect, in a first possible implementation manner, the receiving unit is further configured to receive a maximum transmission unit (MTU) setting message, where the MTU setting message includes an MTU value of the data transmission device during data transmission.

With reference to the seventh aspect or the foregoing possible implementation manner, in a second possible implementation manner, the receiving unit is further configured to receive a retransmission timeout interval setting message, where the retransmission timeout interval setting message includes a retransmission timeout interval value of the data transmission device during TCP data transmission.

According to an eighth aspect, an embodiment of the present disclosure provides a data transmission apparatus, applied to software-defined networking (SDN), where the apparatus is connected to a switching device through a southbound interface and is connected to an application server through a northbound interface, the application server is configured to control data to be sent from a sending device to a receiving device, and the apparatus includes:

a receiving unit, configured to receive a TCP transmission resource allocation request from the application server, where the TCP transmission resource allocation request carries an address of the sending device and an address of the receiving device;

a determining unit, configured to determine a first transmission path and a second transmission path according to the TCP transmission resource allocation request, where the first transmission path is used by the sending device to transmit the data to the receiving device, and the second transmission path is used by the receiving device to transmit a TCP acknowledgment to the sending device; and a sending unit, configured to send a TCP transmission resource allocation response message to the application server, where the TCP transmission resource allocation response message includes bandwidth information of the first transmission path and a TCP round-trip transmission delay, the TCP round-trip transmission delay indicates a pre-estimated time difference between a time T1 at which the sending device sends each data packet through the first transmission path and a time T2 at which the sending device receives a TCP acknowledgment of each data packet through the second transmission path, and the bandwidth information of the first transmission path and the TCP round-trip transmission delay are used to determine an initial value of a transmit window for TCP data transmission between the sending device and the receiving device.

With reference to the eighth aspect, in a first possible implementation manner, the determining unit is further configured to: obtain a transmission delay of the first transmission path and a transmission delay of the second transmission path; and determine the TCP round-trip transmission delay according to the transmission delay of the first transmission path and the transmission delay of the second transmission path, where the TCP round-trip transmission delay is positively correlated with a sum of the transmission delay of the first transmission path and the transmission delay of the second transmission path.

With reference to the eighth aspect or the foregoing possible implementation manner, in a second possible implementation manner, the determining unit is further configured to determine a packet loss rate of the first transmission path; and in this case, the TCP transmission resource allocation response message further includes the packet loss rate of the first transmission path.

With reference to any one of the eighth aspect or the foregoing possible implementation manners, in a third possible implementation manner, the TCP transmission resource allocation request further carries maximum transmission unit (MTU) value information, and the MTU value information includes a maximum value for an MTU value of the sending device and a maximum value for an MTU value of the receiving device;

the determining unit is further configured to determine, according to the MTU value information in the TCP transmission resource allocation request, an MTU value used by the first transmission path to transmit the data, where the MTU value used by the first transmission path to transmit the data is not greater than a smaller value between the maximum value for the MTU value of the sending device and the maximum value for the MTU value of the receiving device; and in this case, the TCP transmission resource allocation response message further includes the MTU value used by the first transmission path to transmit the data.

With reference to any one of the eighth aspect or the foregoing possible implementation manners, in a fourth possible implementation manner, the TCP transmission resource allocation request further includes a bandwidth required for transmitting the data; and the determining unit being configured to determine a first transmission path according to the TCP transmission resource allocation request includes: selecting, by the determining unit according to a network topology of the switching device and from paths between the sending device and the receiving device, a path whose remaining bandwidth resources meet a requirement for transmitting the data as the first transmission path.

With reference to any one of the eighth aspect or the foregoing possible implementation manners, in a fifth possible implementation manner, the selecting, from paths between the sending device and the receiving device, a path whose remaining bandwidth resources meet a requirement for transmitting the data as the first transmission path includes: selecting, by the determining unit, from all paths whose remaining bandwidth resources meet the requirement for transmitting the data between the sending device and the receiving device, a path whose remaining bandwidth resources are the fewest or a path whose hop count is the smallest as the first transmission path.

According to a ninth aspect, an embodiment of the present disclosure provides a data transmission apparatus, applied to software-defined networking (SDN), where a controller in the SDN network is connected to a switching device through a southbound interface and is connected to the apparatus through a northbound interface, at least one application runs on the apparatus, the apparatus is configured to control data to be sent from a sending device to a receiving device, and the apparatus includes:

a sending unit, configured to send a TCP transmission resource allocation request to the controller, where the TCP transmission resource allocation request carries an address of the sending device and an address of the receiving device;

a receiving unit, configured to receive a TCP transmission resource allocation response message from the controller, where the TCP transmission resource allocation response message includes a bandwidth of the first transmission path and a TCP round-trip transmission delay, the TCP round-trip transmission delay indicates a pre-estimated time difference between a time T1 at which the sending device sends each data packet through the first transmission path and a time T2 at which the sending device receives a TCP acknowledgment of each data packet through the second transmission path, the first transmission path is used by the sending device to transmit the data to the receiving device, and the second transmission path is used by the receiving device to transmit a TCP acknowledgment to the sending device; and a determining unit, configured to determine, according to the bandwidth of the first transmission path and the TCP round-trip transmission delay, an initial value of a transmit window for TCP data transmission between the sending device and the receiving device, where the initial value of the transmit window is positively correlated with the bandwidth of the first transmission path and the TCP round-trip transmission delay separately.

With reference to the ninth aspect, in a first possible implementation manner, the initial value of the transmit window is positively correlated with the bandwidth of the first transmission path and the TCP round-trip transmission delay separately.

With reference to the ninth aspect or the foregoing possible implementation manner, in a second possible implementation manner, the TCP transmission resource allocation response message further carries a packet loss rate of the first transmission path; and the determining unit is further configured to determine the initial value of the transmit window according to the packet loss rate, where the initial value of the transmit window is negatively correlated with the packet loss rate.

With reference to any one of the ninth aspect or the foregoing possible implementation manners, in a third possible implementation manner, the determining unit is further configured to determine an initial value of a receive window of the receiving device according to the bandwidth of the first transmission path and the TCP round-trip transmission delay, where the initial value of the receive window is positively correlated with the bandwidth of the first transmission path and the TCP round-trip transmission delay separately.

With reference to any one of the ninth aspect or the foregoing possible implementation manners, in a fourth possible implementation manner, the determining unit is further configured to determine an initial value of a receive window of the receiving device according to the bandwidth of the first transmission path, the TCP round-trip transmission delay, and the packet loss rate, where the initial value of the receive window is positively correlated with the bandwidth of the first transmission path and the TCP round-trip transmission delay separately and is negatively correlated with the packet loss rate.

With reference to any one of the ninth aspect or the foregoing possible implementation manners, in a fifth possible implementation manner, the sending unit is further configured to send a transmit window setting message to the sending device, where the transmit window setting message includes the initial value of the transmit window.

With reference to any one of the ninth aspect or the foregoing possible implementation manners, in a sixth possible implementation manner, the sending unit is further configured to send a receive window setting message to the receiving device, where the receive window setting message includes the initial value of the receive window.

With reference to any one of the ninth aspect or the foregoing possible implementation manners, in a seventh possible implementation manner, the TCP transmission resource allocation request further carries maximum transmission unit (MTU) value information, and the MTU value information is used to indicate a maximum value for an MTU value of the sending device and a maximum value for an MTU value of the receiving device;

the TCP transmission resource allocation response message further includes an MTU value used by the first transmission path to transmit the data; and the determining unit is further configured to determine that the MTU values of the sending device and the receiving device are the MTU value used by the first transmission path to transmit the data.

With reference to any one of the ninth aspect or the foregoing possible implementation manners, in an eighth possible implementation manner, the sending unit is further configured to send an MTU setting message to the sending device and the receiving device, where the MTU setting message includes the MTU value for the first transmission path.

With reference to any one of the ninth aspect or the possible implementation manners, in a ninth possible implementation manner, the determining unit is further configured to determine a retransmission timeout interval of the sending device according to the TCP round-trip transmission delay, where the retransmission timeout interval is positively correlated with the TCP round-trip transmission delay.

With reference to any one of the ninth aspect or the foregoing possible implementation manners, in a tenth possible implementation manner, the sending unit is further configured to send a retransmission timeout interval setting message to the sending device, where the retransmission timeout interval setting message includes the retransmission timeout interval.

With reference to any one of the ninth aspect or the possible implementation manners, in an eleventh possible implementation manner, the determining unit is further configured to determine an acknowledgment wait time of the receiving device according to the TCP round-trip transmission delay, where the acknowledgment wait time is positively correlated with the TCP round-trip transmission delay.

With reference to any one of the ninth aspect or the foregoing possible implementation manners, in a twelfth possible implementation manner, the sending unit is further configured to send an acknowledgment wait time setting message to the receiving device, where the acknowledgment wait time setting message includes the acknowledgment wait time.

According to a tenth aspect, an embodiment of the present disclosure provides a data transmission system, applied to software-defined networking (SDN), and including an application server, a controller, a sending device, a receiving device, and a switching device, where the controller in the SDN network is connected to a switching device through a southbound interface and is connected to the application server through a northbound interface, at least one application runs on the application server, and the application server is configured to control data to be sent from the sending device to the receiving device;

the application server is configured to send a TCP transmission resource allocation request to the controller, where the TCP transmission resource allocation request carries an address of the sending device and an address of the receiving device;

the controller is configured to: determine a first transmission path and a second transmission path according to the TCP transmission resource allocation request, where the first transmission path is used by the sending device to transmit the data to the receiving device, and the second transmission path is used by the receiving device to transmit a TCP acknowledgment to the sending device; and send a TCP transmission resource allocation response message to the application server, where the TCP transmission resource allocation response message includes bandwidth information of the first transmission path and a TCP round-trip transmission delay, and the TCP round-trip transmission delay indicates a pre-estimated time difference between a time T1 at which the sending device sends each data packet through the first transmission path and a time T2 at which the sending device receives a TCP acknowledgment of each data packet through the second transmission path;

the application server is further configured to: determine, according to a bandwidth of the first transmission path and the TCP round-trip transmission delay, an initial value of a transmit window for TCP data transmission between the sending device and the receiving device; and send a transmit window setting message to the sending device, where the transmit window setting message includes the initial value of the transmit window; and the sending device is configured to: set a size of the transmit window to the initial value of the transmit window according to the transmit window setting message; and perform TCP data transmission.

With reference to the tenth aspect, in a first possible implementation manner, the initial value of the transmit window is positively correlated with the bandwidth of the first transmission path and the TCP round-trip transmission delay separately.

With reference to the tenth aspect or the foregoing possible implementation manner, in a second possible implementation manner, the controller is further configured to: obtain a transmission delay of the first transmission path and a transmission delay of the second transmission path; and determine the TCP round-trip transmission delay according to the transmission delay of the first transmission path and the transmission delay of the second transmission path, where the TCP round-trip transmission delay is positively correlated with a sum of the transmission delay of the first transmission path and the transmission delay of the second transmission path.

With reference to any one of the tenth aspect or the foregoing possible implementation manners, in a third possible implementation manner, the controller is further configured to determine a packet loss rate of the first transmission path; and in this case, the TCP transmission resource allocation response message further includes the packet loss rate of the first transmission path.

With reference to any one of the tenth aspect or the foregoing possible implementation manners, in a fourth possible implementation manner, the application server is further configured to determine the initial value of the transmit window according to the packet loss rate, where the initial value of the transmit window is negatively correlated with the packet loss rate.

With reference to any one of the tenth aspect or the foregoing possible implementation manners, in a fifth possible implementation manner, the application server is further configured to determine an initial value of a receive window of the receiving device according to the bandwidth of the first transmission path and the TCP round-trip transmission delay, where the initial value of the receive window is positively correlated with the bandwidth of the first transmission path and the TCP round-trip transmission delay separately.

With reference to any one of the tenth aspect or the foregoing possible implementation manners, in a sixth possible implementation manner, the application server is further configured to determine an initial value of a receive window of the receiving device according to the bandwidth of the first transmission path, the TCP round-trip transmission delay, and the packet loss rate, where the initial value of the receive window is positively correlated with the bandwidth of the first transmission path and the TCP round-trip transmission delay separately and is negatively correlated with the packet loss rate.

With reference to any one of the tenth aspect or the foregoing possible implementation manners, in a seventh possible implementation manner, the application server is further configured to send a receive window setting message to the receiving device, where the receive window setting message includes the initial value of the receive window; and the receiving device is configured to: set a size of the receive window to the initial value of the receive window according to an indication of the receive window setting message, and perform TCP data transmission.

With reference to any one of the tenth aspect or the foregoing possible implementation manners, in an eighth possible implementation manner, the TCP transmission resource allocation request further carries maximum transmission unit (MTU) value information, and the MTU value information is used to indicate a maximum value for an MTU value of the sending device and a maximum value for an MTU value of the receiving device;

the controller is further configured to determine, according to the MTU value information in the TCP transmission resource allocation request, an MTU value used by the first transmission path to transmit the data, where the MTU value used by the first transmission path to transmit the data is not greater than a smaller value between the maximum value for the MTU value of the sending device and the maximum value for the MTU value of the receiving device; and the TCP transmission resource allocation response message further includes the MTU value used by the first transmission path to transmit the data.

With reference to any one of the tenth aspect or the foregoing implementation manners, in a ninth possible implementation manner, the application server is further configured to: determine that the MTU values of the sending device and the receiving device are the MTU value used by the first transmission path to transmit the data; and send an MTU setting message to the sending device and the receiving device, where the MTU setting message includes the MTU value for the first transmission path.

With reference to any one of the tenth aspect or the foregoing possible implementation manners, in a tenth possible implementation manner, the application server is further configured to: determine a retransmission timeout interval of the sending device according to the TCP round-trip transmission delay, where the retransmission timeout interval is positively correlated with the TCP round-trip transmission delay; and send a retransmission timeout interval setting message to the sending device, where the retransmission timeout interval setting message includes the retransmission timeout interval.

With reference to any one of the tenth aspect or the foregoing possible implementation manners, in an eleventh possible implementation manner, the application server is further configured to: determine an acknowledgment wait time of the receiving device according to the TCP round-trip transmission delay, where the acknowledgment wait time is positively correlated with the TCP round-trip transmission delay; and send an acknowledgment wait time setting message to the receiving device, where the acknowledgment wait time setting message includes the acknowledgment wait time.

With reference to any one of the tenth aspect or the foregoing possible implementation manners, in a twelfth possible implementation manner, the TCP transmission resource allocation request further includes a bandwidth required for transmitting the data; and the determining, by the controller, a first transmission path according to the TCP transmission resource allocation request includes: selecting, according to a network topology of the switching device and from paths between the sending device and the receiving device, a path whose remaining bandwidth resources meet a requirement for transmitting the data as the first transmission path.

With reference to any one of the tenth aspect or the foregoing possible implementation manners, in a thirteenth possible implementation manner, the selecting, by the controller from paths between the sending device and the receiving device, a path whose remaining bandwidth resources meet a requirement for transmitting the data as the first transmission path includes: selecting, by the controller, from all paths whose remaining bandwidth resources meet the requirement for transmitting the data between the sending device and the receiving device, a path whose remaining bandwidth resources are the fewest or a path whose hop count is the smallest as the first transmission path.

According to the technical solutions provided in the present disclosure, a slow start process of TCP can be bypassed by setting an initial size of a transmit window for TCP data transmission. In addition, an initial value of the transmit window is determined according to a bandwidth of a data transmission path and a TCP round-trip time. Therefore, transmission can be performed with a relatively high throughput, and a prior-art problem is avoided that halved oscillation of a sliding window caused by repeated network detection eventually affects a network throughput.

BRIEF DESCRIPTION OF DRAWINGS

The following briefly introduces the accompanying drawings used in describing the embodiments.

DESCRIPTION OF EMBODIMENTS

Figure 1:
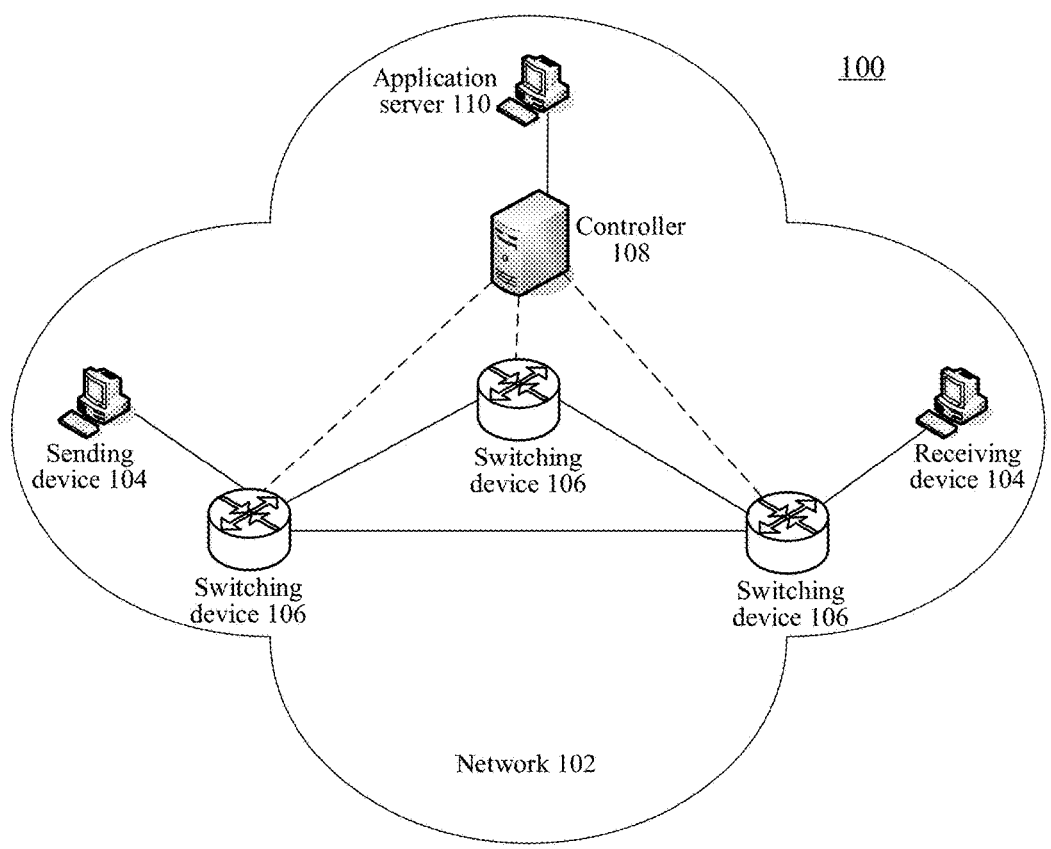
FIG. 1 is a schematic diagram of a networking environment of an SDN data center.

FIG. 1 shows a networking environment 100 of an SDN data center in the prior art. A network 102 is connected to an application server 110, a controller 108, one or more switching devices 106, and one or more computing devices 104 that may be regarded as a sending device or a receiving device. Application programs run on the application server 110. The application server 110 belongs to an application layer of an SDN network, and the application programs include different network services and applications. The controller 108 belongs to a control layer of the SDN network, and is a logical control center of the SDN network. The controller 108 connects to the switching device(s) 106 through a southbound interface, provides network instructions, maintains a network topology, and controls data forwarding by the switching device(s) 106. The controller 108 further connects to the application server 110 through a northbound interface. The switching device 106 belongs to a data forwarding layer of the SDN network, and is responsible for data processing, forwarding, status collection, or the like. The computing device 104 is a host running in a data center network, and data may be transmitted between computing devices 104 using the TCP protocol.

The network 102 may be the Internet, an intranet, a local area network (LAN), a wide area network (WAN), a storage area network (SAN), or the like, or a combination of the foregoing networks.

An objective of FIG. 1 is to introduce participants of TCP data transmission in the data center and relationships between the participants. Therefore, the described SDN data center environment 100 is greatly simplified. Because some aspects of the SDN data center network are common knowledge, these aspects, such as authentication schemes and security, are not described in detail herein.

Figure 2:
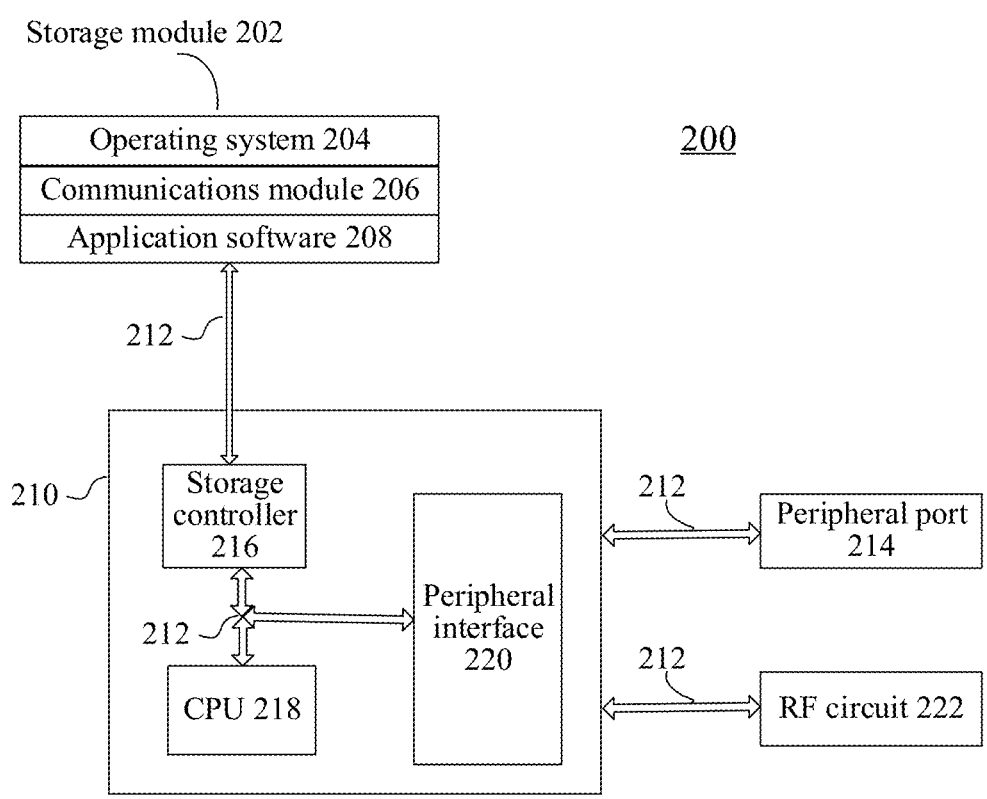
FIG. 2 is a schematic diagram of a computing device according to embodiments of the present disclosure.

The application server 110, the controller 108, the sending or receiving device 104 shown in FIG. 1 may have any suitable structure. FIG. 2 is a block diagram of a computing device 200 that is generally applicable to the application server 110, the controller 108, the sending or receiving device 104 as shown in FIG. 1.

The computing device 200 includes a storage module 202, a storage controller 216, one or more processors (such as central processing units (CPUs)) 218, a peripheral interface 220, and a peripheral port 214. These components communicate with each other through one or more communications buses or signal cables 212. The computing device 200 may be any electronic communications device, including, but not limited to, a portable computer, a personal desktop computer, a tablet computer, a mobile phone, a personal digital assistant (PDA), a server, a multiprocessor system, a microprocessor-based system, a set top box, a programmable consumer appliance, a network PC, a micro-computer, a mainframe computer, and a distributed computing environment that includes any one of the foregoing systems or devices. The computing device 200 in FIG. 2 is merely an example of the computing devices. The computing device 200 may include more or fewer components than those shown in FIG. 2, or may have a different component configuration manner. The components shown in FIG. 2 may be implemented by hardware, software, or a combination of hardware and software.

The storage module 202 may include a high-speed random access memory (RAM), or may include a non-volatile memory such as one or more magnetic disk storages, a flash memory, or another non-volatile memory. In some embodiments, the storage module may further include a remote memory that is separate from the one or more processors 218, and the remote memory is, for example, a web disk accessed by a radio frequency (RF) circuit 222, the peripheral port 214, and a communications network (not shown in FIG. 2). The communications network may be the Internet, an intranet, a local area network (LAN), a wide area network (WAN), a storage area network (SAN), or a combination of the foregoing networks, or the like. Access of another component of the computing device 200 to the storage module 202, for example, access of the CPU 218 and the peripheral interface 220 to the storage module 202 may be controlled using the storage controller 216.

The peripheral interface 220 couples a peripheral input and output of the computing device 200 to the CPU 218 and the storage module 202 of the device. The one or more processors 218 process data and accomplish various functions of the device 200 by running various software and/or executing various instructions stored in the storage module 202.

In some embodiments, the peripheral interface 220, the one or more processors 218, and the storage controller 216 may be integrated into one chip, for example, a chip 210. In some other embodiments, the peripheral interface 220, the one or more processors 218, and the storage controller 216 may be implemented using different chips.

The RF circuit 222 receives and sends electromagnetic waves. The RF circuit 222 performs electrical/magnetic signal conversion, and communicates with the communications network or another communications device using the electromagnetic waves. The RF circuit 222 may include a circuit system well known to a person skilled in the art, to perform the foregoing functions. For example, the circuit system includes, but is not limited to, an antenna system, an RF transceiver, one or more amplifiers, a tuner, one or more oscillators, a digital signal processor, an encoding and decoding chip set, a subscriber identity module (SIM) card, and a memory. The RF circuit 222 may communicate with a communications network such as the Internet, an intranet, and/or a wireless network, for example, a mobile phone network, a wireless local area network, and/or a metropolitan area network (MAN), or communicate with another device connected to the foregoing networks. The communication may use various communication standards, protocols, and technologies, for example, including, but not limited to, the Hypertext Transfer Protocol (HTTP), the Global System for Mobile Communications (GSM), Enhanced Data rates for GSM Evolution (EDGE), a Wideband Code Division Multiple Access (W-CDMA) technology, a Code Division Multiple Access (CDMA) technology, a Time Division Multiple Access (TDMA) technology, Bluetooth, a Wireless Fidelity (Wi-Fi) technology (for example, IEEE 802.21a, IEEE 802.21b, IEEE 802.21g, and/or IEEE 802.21n), Voice over Internet Protocol (VoIP), a worldwide interoperability for microwave access (Wi-MAX), the Simple Mail Transfer Protocol, instant messaging (IM), and/or a short message service (SMS), or other communications protocols, including other suitable communications protocols that have not been developed on the date of this application.

In some embodiments, the computing device 200 further includes an audio circuit, an audio output device, and an audio input device (not shown), to provide an audio interface between the computing device 200 and a user. The audio circuit receives audio data from the peripheral interface 220, converts the audio data into an electrical signal, and transmits the electrical signal to the audio output device, for example, a loudspeaker. The audio output device converts the electrical signal into a sound wave that can be heard by the user. The audio circuit is further configured to receive an electrical signal that is converted from the sound wave by the audio input device, converts the electrical signal into audio data, and transmits the audio data to the peripheral interface 220 for processing. The audio data may be transmitted by the peripheral interface 220 to the storage module 202 and/or the RF circuit 222, or may be obtained from the storage module 202 and/or the RF circuit 222. In some embodiments, the audio circuit may further include an earphone jack (not shown in FIG. 2). The earphone jack provides an interface between the audio circuit and a peripheral movable audio input/output device. The movable audio input/output device may be an earphone having only an output function, or may be a device including both an input (a microphone) function and an output function.

In some embodiments, the computing device 200 further includes an input/output (I/O) subsystem (not shown), to provide an interface between an input/output peripheral and the peripheral interface 220 of the computing device 200. For example, the input/output peripheral includes, but is not limited to, a display and another input/control device. The I/O subsystem includes a display controller and one or more input controllers for another output or control device. The one or more input controllers receive/send electrical signals from/to another input or control device. The another input/control device may include a physical button (for example, a pressing button, or a joystick button), a keyboard, a joystick, and the like.

In some embodiments, the storage module 202 includes an operating system 204, a communication module (or an instruction set) 206, a graphics module (or an instruction set) 208, and one or more pieces of application software (or instruction sets) 208.

The operating system 204 (for example, Darwin, RTXC, Linux, Unix, OS X, Windows, or an embedded operating system such as VxWorks) includes various software components and/or drivers that are used for controlling and managing common system tasks (for example, memory management, control over a storage device, and power management) and that facilitate communication between various hardware and software components.

The communication module 206 is configured to communicate with another device through one or more peripheral ports 214, and further includes various software components used for processing data received by the RF circuit 222 and/or the peripheral port 214. The peripheral port 214 (for example, a universal serial bus (USB) or FireWire) is suitable to be coupled to another device indirectly using a network (for example, the Internet or a wireless LAN) or directly.

The one or more pieces of application software 208 may include any application installed in the device 200. The application includes, but is not limited to, a browser, an address book, a contacts list, email, instant messaging, text processing, keyboard emulation, widgets, Java applications, encryption, speech recognition, voice duplication, positioning (for example Global Positioning System (GPS)), and a music player.

Figure 3:
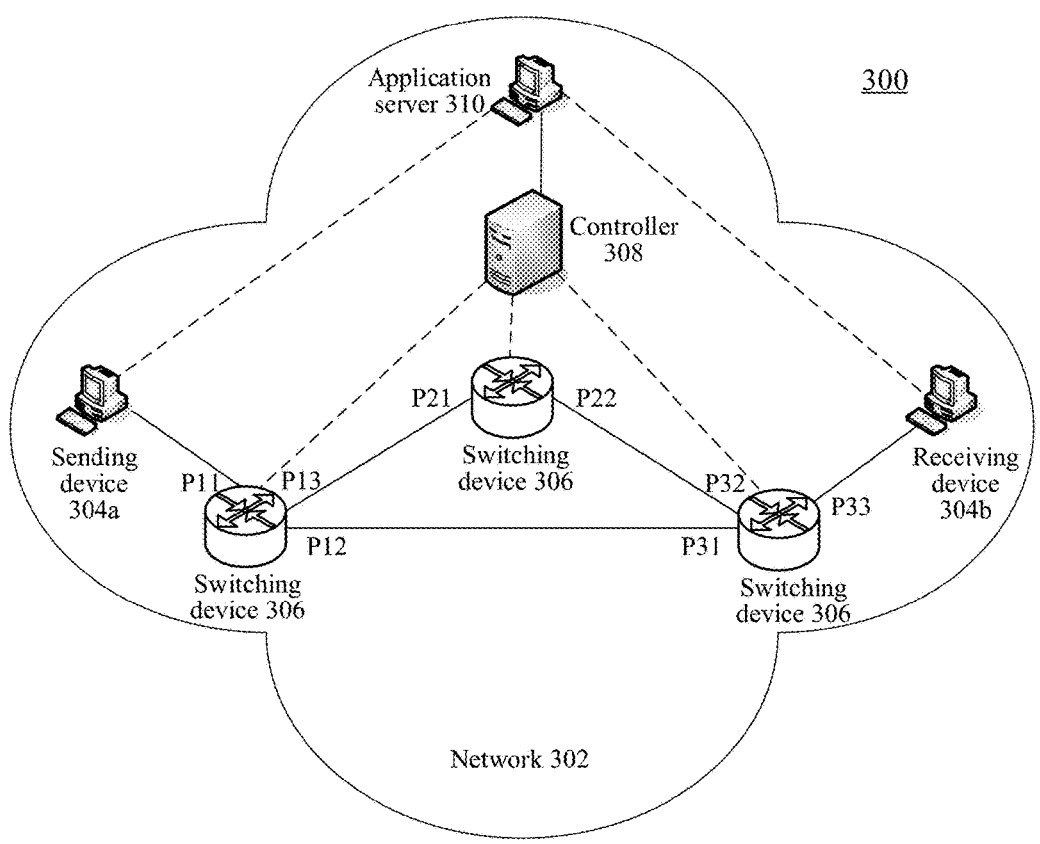
FIG. 3 is a schematic diagram of a data transmission system according to an embodiment of the present disclosure.

FIG. 3 is a schematic structural diagram of a data transmission system 300 according to an embodiment of the present disclosure. As shown in FIG. 3, the data transmission system may include: an application server 310, a controller 308, one or more computing devices 304 that act as sending devices or receiving devices, and one or more switching devices 306. Connection of the system is performed using a network 302. The controller 308 is a logical control center of an SDN network. The controller 308 is connected to the switching device(s) 306 through a southbound interface, provides a network instruction to the switching device 306, and manages a network topology between switching devices 306. The controller 308 is connected to the application server 310 through a northbound interface. The application server 310 may control transmission of data from the sending device 304a to the receiving device 304b. It should be understood that the sending device 304a can also be a receiving device, and the receiving device 304b can also be a sending device.

Computing logic or an application program runs on the sending device 304 and the receiving device 304. The computing logic or the application program is managed by an application that runs on the application server 310. After a large bulk of data is processed by the computing logic or the application program of the sending device 304, a new bulk of data is formed, and the data needs to be sent, by means of scheduling and coordination by the application, to the receiving device 304 for processing.

Physical ports of the sending device 304 and the receiving device 304 are connected to the SDN network managed by the controller 308, and the sending device 304 and the receiving device 304 are connected to each other using the network. As shown in FIG. 3, the sending device 304 is connected to a port P11 of the switching device 306, and the receiving device 304 is connected to a port P33 of the switching device 306

The controller 308 provides the northbound interface, and provides a function of customizing quality of service (QoS) of a network path. The application that runs on the application server 310 may access the northbound interface of the controller 308 using a management network.

In this embodiment of the present disclosure, the application server 310 sends a TCP transmission resource allocation request to the controller 308. The TCP transmission resource allocation request carries an address of the sending device 304a and an address of the receiving device 304b.

The controller 308 determines a first transmission path and a second transmission path according to the TCP transmission resource allocation request. The first transmission path is used by the sending device 304a to transmit the data to the receiving device 304, and the second transmission path is used by the receiving device 304b to transmit a TCP acknowledgment to the sending device. The controller 308 sends a TCP transmission resource allocation response message to the application server 310. The TCP transmission resource allocation response message includes bandwidth information of the first transmission path and a TCP round-trip transmission delay. The TCP round-trip transmission delay indicates a pre-estimated time difference between a time T1 at which the sending device 304a sends each data packet through the first transmission path and a time T2 at which the sending device 304a receives a TCP acknowledgment of each data packet through the second transmission path.

The application server 310 further determines, according to a bandwidth of the first transmission path and the TCP round-trip transmission delay, an initial value of a transmit window for TCP data transmission between the sending device 304a and the receiving device 304b. The initial value of the transmit window is positively correlated with the bandwidth of the first transmission path and the TCP round-trip transmission delay separately. The application server 310 sends a transmit window setting message to the sending device 304a, where the transmit window setting message includes the initial value of the transmit window.

The sending device 304a sets a size of the transmit window to the initial value of the transmit window according to the transmit window setting message, and perform TCP data transmission.

The initial value of the transmit window refers to an amount of data allowed to be sent within a first round-trip time (RTT) when the sending device 304a performs TCP data transmission.

The controller 308 further obtains a transmission delay of the first transmission path and a transmission delay of the second transmission path, and determines the TCP round-trip transmission delay according to the transmission delay of the first transmission path and the transmission delay of the second transmission path. The TCP round-trip transmission delay is positively correlated with a sum of the transmission delay of the first transmission path and the transmission delay of the second transmission path.

Optionally, the controller 308 detects the transmission delay of the first transmission path and the transmission delay of the second transmission path according to operation, administration, and maintenance (OAM) features of the first transmission path and the second transmission path, and determines the TCP round-trip transmission delay according to the transmission delays. The TCP round-trip transmission delay is positively correlated with the transmission delay of the first transmission path and the transmission delay of the second transmission path separately.

Optionally, the TCP round-trip transmission delay is the sum of the transmission delay of the first transmission path and the transmission delay of the second transmission path.

Optionally, the controller 308 further pre-estimates a TCP layer processing delay of the receiving device. The TCP round-trip transmission delay is a sum of the transmission delay of the first transmission path, the transmission delay of the second transmission path, and the TCP layer processing delay of the receiving device 304b.

Optionally, the controller 308 further pre-estimates a TCP layer processing delay of the sending device 304a. The TCP round-trip transmission delay is a sum of the transmission delay of the first transmission path, the transmission delay of the second transmission path, the TCP layer processing delay of the sending device, and a TCP layer processing delay of the receiving device.

Optionally, the application server 310 first determines an RTT between the sending device and the receiving device according to the TCP round-trip transmission delay. The RTT is positively correlated with the TCP round-trip transmission delay.

Optionally, it is determined that the TCP round-trip transmission delay is the RTT.

Optionally, the application server 310 further pre-estimates TCP layer processing delays of the sending device 304a and the receiving device 304b. The RTT is a sum of the TCP round-trip transmission delay and the TCP layer processing delays of the sending device 304a and the receiving device 304b.

Optionally, the application server 310 further pre-estimates a TCP layer processing delay of the receiving device 304b. The RTT is a sum of the TCP round-trip transmission delay and the TCP layer processing delay of the receiving device 304b.

Optionally, a size of the transmit window of the sending device is expressed as:

Transmit window=Bandwidth of first transmission path×RTT.

Optionally, the controller 308 further determines a packet loss rate of the first transmission path. In this case, the TCP transmission resource allocation response message further includes the packet loss rate of the first transmission path. The application server 310 further determines the initial value of the transmit window according to the packet loss rate. The initial value of the transmit window is positively correlated with the bandwidth of the first transmission path and the TCP round-trip transmission delay separately and is negatively correlated with the packet loss rate.

Optionally, a size of the transmit window of the sending device is expressed as:

Transmit window=Bandwidth of first transmission path×RTT×(1−Packet loss rate).

Optionally, the application server 310 further determines an initial value of a receive window of the receiving device 304b according to the bandwidth of the first transmission path and the TCP round-trip transmission delay. The initial value of the receive window is positively correlated with the bandwidth of the first transmission path and the TCP round-trip transmission delay separately.

Optionally, a size of the receive window of the receiving device is expressed as:

Rwnd=Bandwidth of first transmission path×RTT.

Optionally, the application server 310 further determines an initial value of a receive window of the receiving device 304b according to the bandwidth of the first transmission path, the TCP round-trip transmission delay, and the packet loss rate. The initial value of the receive window is positively correlated with the bandwidth of the first transmission path and the TCP round-trip transmission delay separately and is negatively correlated with the packet loss rate.

Optionally, a size of the receive window of the receiving device is expressed as:

Rwnd=Bandwidth of first transmission path×RTT×(1−Packet loss rate).

The application server 310 further sends a receive window setting message to the receiving device 304b, and the receive window setting message includes the initial value of the receive window. The receiving device 304b sets a size of the receive window to the initial value of the receive window according to an indication of the receive window setting message, and performs TCP data transmission.

Optionally, during subsequent TCP data transmission, the sending device 304a determines, according to that the transmit window equals Rwnd, a size of the transmit window for the TCP data transmission.

Optionally, the application server 310 further determines an initial value of a congestion window Cwnd of the sending device 304a according to the bandwidth of the first transmission path and the TCP round-trip transmission delay. The initial value of the Cwnd is positively correlated with the bandwidth of the first transmission path and the TCP round-trip transmission delay separately.

Optionally, a size of the congestion window of the sending device is expressed as:

Cwnd=Bandwidth of first transmission path×RTT.

Optionally, the application server 310 further determines an initial value of a congestion window Cwnd of the sending device 304a according to the bandwidth of the first transmission path, the TCP round-trip transmission delay, and the packet loss rate. The initial value of the Cwnd is positively correlated with the bandwidth of the first transmission path and the TCP round-trip transmission delay separately and is negatively correlated with the packet loss rate.

Optionally, a size of the congestion window of the sending device is expressed as:

Cwnd=Bandwidth of first transmission path×RTT×(1−Packet loss rate).

Optionally, the application server 310 further sends a congestion window setting message to the sending device 304a, and the congestion window setting message includes the initial value of the congestion window. The sending device 304a sets a size of the congestion window to the initial value of the congestion window according to an indication of the congestion window setting message, and performs TCP data transmission.

Optionally, when the sending device 304a performs the TCP data transmission, a value of the transmit window is a smaller value between values of the congestion window and the receive window.

Optionally, the TCP transmission resource allocation request further carries maximum transmission unit (MTU) value information, and the MTU value information is used to indicate a maximum value for an MTU value of the sending device 304a and a maximum value for an MTU value of the receiving device 304b. The controller 308 further determines, according to the MTU value information in the TCP transmission resource allocation request, an MTU value used by the first transmission path to transmit the data. The MTU value used by the first transmission path to transmit the data is not greater than a smaller value between the maximum value for the MTU value of the sending device 304a and the maximum value for the MTU value of the receiving device 304b. The TCP transmission resource allocation response message further includes the MTU value used by the first transmission path to transmit the data. The application server 310 further determines that the MTU values of the sending device 304a and the receiving device 304b are the MTU value used by the first transmission path to transmit the data, and sends an MTU setting message to the sending device 304a and the receiving device 304b. The MTU setting message includes the MTU value for the first transmission path.

Optionally, the controller 308 determines, within a value range indicated by the MTU value information, an optimal MTU value for the first transmission path according to an OAM feature of the first transmission path.

The sending device 304a and the receiving device 304b set MTU values of the devices to the optimal MTU value, such that it can be ensured that data is segmented according to an optimal length, and more effective TCP data transmission is implemented.

The controller 308 further sends an MTU setting message to the switching device 306 on the first transmission path. The MTU setting message is used to instruct the switching device 306 on the first transmission path to set an MTU value to the MTU value used by the first transmission path to transmit the data.

Optionally, the application server 310 further determines a retransmission timeout interval of the sending device 304a according to the TCP round-trip transmission delay. The retransmission timeout interval is positively correlated with the TCP round-trip transmission delay. The application server 310 sends a retransmission timeout interval setting message to the sending device 304a, where the retransmission timeout interval setting message includes the retransmission timeout interval.

Optionally, the application server 310 sets the retransmission timeout interval to a round-trip time RTT.

The retransmission timeout interval refers to a maximum wait time during which, after sending a data packet, the sending device 304a waits for an acknowledgment of the data packet to be returned.

Optionally, the application server 310 further determines an acknowledgment wait time of the receiving device 304b according to the TCP round-trip transmission delay. The acknowledgment wait time is positively correlated with the TCP round-trip transmission delay. The application server 310 sends an acknowledgment wait time setting message to the receiving device 304b, where the acknowledgment wait time setting message includes the acknowledgment wait time.

Optionally, the application server 310 sets the acknowledgment wait time to a round-trip time RTT.

The acknowledgment wait time is a maximum wait time during which, after receiving a data packet, the receiving device 304b postpones sending of an acknowledgment.

Optionally, the application server 310 estimates an expected network bandwidth according to an amount of to-be-transmitted data, a schedule, and features of network interface cards in the sending device 304a and the receiving device 304b, and adds a requested path bandwidth for TCP data transmission to the TCP transmission resource allocation request.

Optionally, in determining a first transmission path according to the TCP transmission resource allocation request, the controller 308 selects, according to a network topology of the switching device 306 and from paths between the sending device 304a and the receiving device 304b, a path whose remaining bandwidth resources meet a requirement for transmitting the data as the first transmission path.

Optionally, in selecting, from paths between the sending device 304a and the receiving device 304b, a path whose remaining bandwidth resources meet a requirement for transmitting the data as the first transmission path, the controller 308 selects, from all paths whose remaining bandwidth resources meet the requirement for transmitting the data between the sending device and the receiving device, a path whose remaining bandwidth resources are the fewest or a path whose hop count is the smallest as the first transmission path.

The controller 308 selects a set of available paths between the sending device 304a and the receiving device 304b according to the network topology of the switching device 306. As shown in FIG. 3, two paths are available and may be indicated as a path 1 (P11, P12, P31, P33) and a path 2 (P11, P13, P21, P22, P32, P33) using ports of switching devices 306. Remaining bandwidths of the ports of the switching devices on the path 1 and the path 2 are determined. A bandwidth that has been allocated is subtracted from physical bandwidths of a port to obtain a remaining bandwidth of the port. A smallest value of remaining bandwidths of ports on a path is used as a remaining bandwidth of the path.

Optionally, if all remaining bandwidths of the set of available paths are less than a bandwidth requested by the application server, a path whose bandwidth is the largest is selected as the first transmission path.

The controller 308 sends a bandwidth control message to a switching device 306 on the first transmission path. The bandwidth control message is used to indicate a bandwidth used by the switching device 306 on the first transmission path to transmit the data.

Optionally, the controller 308 further separately sends a flow entry to a switching device 306 on the first transmission path and a switching device 306 on the second transmission path, to instruct the switching device 306 on the first transmission path to perform TCP data transmission and the switching device 306 on the second transmission path to transmit the TCP acknowledgment.

Optionally, the controller 308 further sends a network resource identifier to the application server 310. After completing the TCP data transmission, the application server 310 further sends a TCP transmission resource release request to the controller 308. The TCP transmission resource release request carries the network resource identifier. The controller 308 releases, according to the network resource identifier, a path resource for performing the TCP data transmission.

According to the technical solution provided in this embodiment, resources and parameters for TCP data transmission can be properly configured. When TCP data transmission is required, an application server sends a TCP transmission resource allocation request to a controller through a northbound interface provided by the controller. The controller configures a path for TCP data transmission according to the TCP transmission resource allocation request, and determines path information such as a bandwidth of the path, a TCP round-trip transmission delay, a packet loss rate of the path, and an optimal MTU value of the path. After the path information is returned to the application server, the application server can properly configure parameters for the TCP data transmission. According to these parameters, the application server can bypass a slow start process of TCP by setting an initial size of a transmit window for the TCP data transmission. In addition, an initial value of the transmit window is determined according to a bandwidth of a data transmission path and a TCP round-trip time. Therefore, transmission can be performed with a relatively high throughput, and a prior-art problem is avoided that halved oscillation of a sliding window caused by repeated network detection eventually affects a network throughput. An MTU value returned by the controller is used to ensure that data can be segmented according to an optimal length and transmitted on a network device, and more effective TCP data transmission is implemented.

Figure 4:
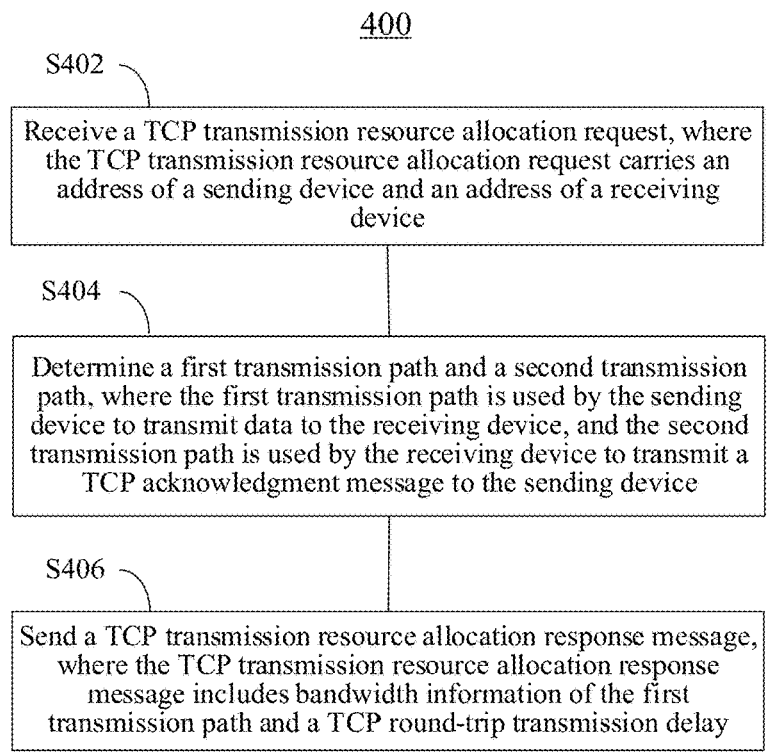
FIG. 4 is a flowchart of a data transmission method according to an embodiment of the present disclosure.

FIG. 4 is a flowchart of an example of a data transmission method 400 according to an embodiment of the present disclosure, so as to implement more effective TCP data transmission. In a specific implementation process, the data transmission method 400 may be performed by a controller in an SDN data center. The method 400 is specifically applied to software-defined networking (SDN), and a controller in the SDN network is a logical control center of the SDN network. The controller is connected to a switching device through a southbound interface, provides a network instruction to the switching device, and manages a network topology between switching devices. The controller is connected to an application server through a northbound interface. At least one application runs on the application server. When the application server determines that currently data needs to be transmitted from a sending device to a receiving device using the TCP protocol, as shown in FIG. 4, the method specifically includes the following steps.

S402: The controller receives a TCP transmission resource allocation request from the application server, where the TCP transmission resource allocation request carries an address of the sending device and an address of the receiving device.

Optionally, the address of the sending device and the address of the receiving device are Internet Protocol (IP) addresses or Media Access Control (MAC) addresses.

Optionally, the controller provides the northbound interface, and provides a function of customizing quality of service (QoS) of a network path. The application that runs on the application server may access the northbound interface of the controller using a management network.

S404: The controller determines a first transmission path and a second transmission path according to the TCP transmission resource allocation request, where the first transmission path is used by the sending device to transmit the data to the receiving device, and the second transmission path is used by the receiving device to transmit a TCP acknowledgment to the sending device.

S406: The controller sends a TCP transmission resource allocation response message to the application server, where the TCP transmission resource allocation response message includes bandwidth information of the first transmission path and a TCP round-trip transmission delay, the TCP round-trip transmission delay indicates a pre-estimated time difference between a time T1 at which the sending device sends each data packet through the first transmission path and a time T2 at which the sending device receives a TCP acknowledgment of each data packet through the second transmission path, and the bandwidth information of the first transmission path and the TCP round-trip transmission delay are used to determine an initial value of a transmit window for TCP data transmission between the sending device and the receiving device.

Before the sending, by the controller, a TCP transmission resource allocation response message to the application server, the method 400 further includes: obtaining, by the controller, a transmission delay of the first transmission path and a transmission delay of the second transmission path, and determining the TCP round-trip transmission delay according to the transmission delay of the first transmission path and the transmission delay of the second transmission path. The TCP round-trip transmission delay is positively correlated with a sum of the transmission delay of the first transmission path and the transmission delay of the second transmission path.

Optionally, the controller detects the transmission delay of the first transmission path and the transmission delay of the second transmission path according to operation, administration, and maintenance (OAM) features of the first transmission path and the second transmission path, and determines the TCP round-trip transmission delay according to the transmission delay of the first transmission path and the transmission delay of the second transmission path.

Optionally, the TCP round-trip transmission delay is the sum of the transmission delay of the first transmission path and the transmission delay of the second transmission path.

Optionally, the controller further pre-estimates a TCP layer processing delay of the receiving device. The TCP round-trip transmission delay is a sum of the transmission delay of the first transmission path, the transmission delay of the second transmission path, and the TCP layer processing delay of the receiving device.

Optionally, the controller further pre-estimates a TCP layer processing delay of the sending device. The TCP round-trip transmission delay is a sum of the transmission delay of the first transmission path, the transmission delay of the second transmission path, the TCP layer processing delay of the sending device, and a TCP layer processing delay of the receiving device.

Optionally, before the sending, by the controller, a TCP transmission resource allocation response message to the application server, the method 400 further includes: determining, by the controller, a packet loss rate of the first transmission path. In this case, the TCP transmission resource allocation response message further includes the packet loss rate of the first transmission path.

Optionally, the controller collects statistics about the packet loss rate on the first transmission path according to an experience library, adds a reserved packet loss rate, and determines information about the packet loss rate of the first transmission path.

Optionally, the TCP transmission resource allocation request further carries maximum transmission unit (MTU) value information, and the MTU value information includes a maximum value for an MTU value of the sending device and a maximum value for an MTU value of the receiving device. The method 400 further includes: determining, by the controller according to the MTU value information in the TCP transmission resource allocation request, an MTU value used by the first transmission path to transmit the data. The MTU value used by the first transmission path to transmit the data is not greater than a smaller value between the maximum value for the MTU value of the sending device and the maximum value for the MTU value of the receiving device. In this case, the TCP transmission resource allocation response message further includes the MTU value used by the first transmission path to transmit the data.

Optionally, the controller determines, within a value range indicated by the MTU value information, an optimal MTU value for the first transmission path according to an OAM feature of the first transmission path, such that it can be ensured that data is segmented according to an optimal length, and more effective TCP data transmission is implemented.

Optionally, the TCP transmission resource allocation request further includes a bandwidth required for transmitting the data; and the determining, by the controller, a first transmission path according to the TCP transmission resource allocation request includes: selecting, according to a network topology of the switching device and from paths between the sending device and the receiving device, a path whose remaining bandwidth resources meet a requirement for transmitting the data as the first transmission path.

Specifically, the selecting, by the controller from paths between the sending device and the receiving device, a path whose remaining bandwidth resources meet a requirement for transmitting the data as the first transmission path includes: selecting, by the controller, from all paths whose remaining bandwidth resources meet the requirement for transmitting the data between the sending device and the receiving device, a path whose remaining bandwidth resources are the fewest or a path whose hop count is the smallest as the first transmission path.

Optionally, the controller selects a set of available paths between the sending device and the receiving device according to the network topology of the switching device, and determines remaining bandwidths of ports of switching devices on the available paths. A bandwidth that has been allocated is subtracted from physical bandwidths of a port to obtain a remaining bandwidth of the port. A smallest value of remaining bandwidths of ports on a path is used as a remaining bandwidth of the path.

Optionally, if all remaining bandwidths of the set of available paths are less than a bandwidth requested by the application server, a path whose bandwidth is the largest is selected as the first transmission path.

The method 400 further includes: sending, by the controller, a bandwidth control message to a switching device on the first transmission path. The bandwidth control message is used to indicate a bandwidth used by the switching device on the first transmission path to transmit the data.

Optionally, the method 400 further includes separately sending a flow entry to a switching device on the first transmission path and a switching device on the second transmission path, to instruct the switching device on the first transmission path to perform TCP data transmission and the switching device on the second transmission path to transmit the TCP acknowledgment.

According to the technical solution provided in this embodiment, a controller can properly allocate resources for TCP data transmission. The controller receives a TCP transmission resource allocation request from an application server through a northbound interface, properly configures a path and a bandwidth for the TCP data transmission according to the TCP transmission resource allocation request, and determines information such as a TCP round-trip transmission delay of the path, a packet loss rate of the path, and an optimal MTU value of the path. After the path information is returned to the application server side, the application server can properly configure parameters for the TCP data transmission. According to these parameters, the application server can bypass a slow start process of TCP by setting an initial size of a transmit window for the TCP data transmission. In addition, an initial value of the transmit window is determined according to a bandwidth of a data transmission path and a TCP round-trip time. Therefore, transmission can be performed with a relatively high throughput, and a prior-art problem is avoided that halved oscillation of a sliding window caused by repeated network detection eventually affects a network throughput. An MTU value returned by the controller is used to ensure that data can be segmented according to an optimal length and transmitted on a network device, and more effective TCP data transmission is implemented.

Figure 5:
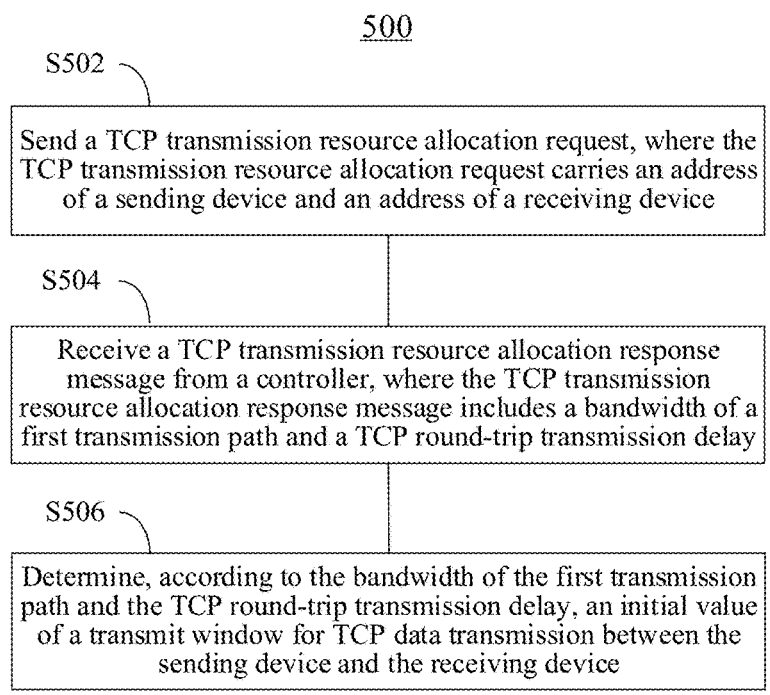
FIG. 5 is a flowchart of a data transmission method according to an embodiment of the present disclosure.

FIG. 5 is a flowchart of an example of a data transmission method 500 according to an embodiment of the present disclosure, so as to implement more effective TCP data transmission. The method 500 is specifically applied to software-defined networking (SDN), and a controller in the SDN network is a logical control center of the SDN network. The controller is connected to a switching device through a southbound interface, provides a network instruction to the switching device, and manages a network topology between switching devices. The controller is connected to an application server through a northbound interface. In a specific implementation process, the data transmission method 500 may be performed by an application server in an SDN data center. More specifically, the method 500 may be performed by an application that runs on the application server. When the application determines that currently data needs to be transmitted from a sending device to a receiving device using the TCP protocol, as shown in FIG. 5, the method specifically includes the following steps.

S502: The application server sends a TCP transmission resource allocation request to the controller, where the TCP transmission resource allocation request carries an address of the sending device and an address of the receiving device.

S504: The application server receives a TCP transmission resource allocation response message from the controller, where the TCP transmission resource allocation response message includes a bandwidth of the first transmission path and a TCP round-trip transmission delay, the TCP round-trip transmission delay indicates a pre-estimated time difference between a time T1 at which the sending device sends each data packet through the first transmission path and a time T2 at which the sending device receives a TCP acknowledgment of each data packet through the second transmission path, the first transmission path is used by the sending device to transmit the data to the receiving device, and the second transmission path is used by the receiving device to transmit a TCP acknowledgment to the sending device.

S506: The application server determines, according to the bandwidth of the first transmission path and the TCP round-trip transmission delay, an initial value of a transmit window for TCP data transmission between the sending device and the receiving device. The initial value of the transmit window is positively correlated with the bandwidth of the first transmission path and the TCP round-trip transmission delay separately.

Optionally, the application server first determines a round-trip time RTT between the sending device and the receiving device according to the TCP round-trip transmission delay. The RTT is positively correlated with the TCP round-trip transmission delay.

Optionally, it is determined that the TCP round-trip transmission delay is the round-trip time RTT.

Optionally, the application server further pre-estimates TCP layer processing delays of the sending device and the receiving device. The round-trip time RTT is a sum of the TCP round-trip transmission delay and the TCP layer processing delays of the sending device and the receiving device.

Optionally, the application server further pre-estimates a TCP layer processing delay of the receiving device. The round-trip time (RTT) is a sum of the TCP round-trip transmission delay and the TCP layer processing delay of the receiving device.

Optionally, the initial value of the transmit window is positively correlated with the bandwidth of the first transmission path and the TCP round-trip transmission delay separately.

Optionally, a size of the transmit window of the sending device is expressed as:

Transmit window=Bandwidth of first transmission path×RTT.

Optionally, the TCP transmission resource allocation response message further carries a packet loss rate of the first transmission path. The application server is further configured to determine the initial value of the transmit window according to the packet loss rate. The initial value of the transmit window is positively correlated with the bandwidth of the first transmission path and the TCP round-trip transmission delay separately and is negatively correlated with the packet loss rate.

Optionally, a size of the transmit window of the sending device is expressed as:

Transmit window=Bandwidth of first transmission path×RTT×(1−Packet loss rate).

Optionally, the application server is further configured to determine an initial value of a receive window of the receiving device according to the bandwidth of the first transmission path and the TCP round-trip transmission delay. The initial value of the receive window is positively correlated with the bandwidth of the first transmission path and the TCP round-trip transmission delay separately.

Optionally, a size of the receive window of the receiving device is expressed as:

$$Rwnd = \text{Bandwidth of first transmission path} \times RTT.$$

Optionally, the application server is further configured to determine an initial value of a receive window of the receiving device according to the bandwidth of the first transmission path, the TCP round-trip transmission delay, and the packet loss rate. The initial value of the receive window is positively correlated with the bandwidth of the first transmission path and the TCP round-trip transmission delay separately and is negatively correlated with the packet loss rate.

Optionally, a size of the receive window of the receiving device is expressed as:

$$Rwnd = \text{Bandwidth of first transmission path} \times RTT \times (1 - \text{Packet loss rate}).$$

Specifically, the application server is further configured to send a transmit window setting message to the sending device, and the transmit window setting message includes the initial value of the transmit window. The sending device receives the transmit window setting message, sets a size of the transmit window to the initial value of the transmit window according to the transmit window setting message, and performs TCP data transmission according to the size of the transmit window.

Specifically, the application server is further configured to send a receive window setting message to the receiving device, and the receive window setting message includes the initial value of the receive window. The receiving device receives the receive window setting message, and sets a size of the receive window of the receiving device to the initial value of the receive window according to an indication of the receive window setting message.

Optionally, during subsequent TCP data transmission, the sending device may determine, according to that the transmit window equals Rwnd, a size of the transmit window for TCP data transmission.

Optionally, the application server is further configured to determine an initial value of a congestion window Cwnd of the sending device according to the bandwidth of the first transmission path and the TCP round-trip transmission delay. The initial value of the Cwnd is positively correlated with the bandwidth of the first transmission path and the TCP round-trip transmission delay separately.

Optionally, a size of the congestion window of the sending device is expressed as:

$$Cwnd = \text{Bandwidth of first transmission path} \times RTT.$$

Optionally, the application server is further configured to determine an initial value of a congestion window Cwnd of the sending device according to the bandwidth of the first transmission path, the TCP round-trip transmission delay, and the packet loss rate. The initial value of the Cwnd is positively correlated with the bandwidth of the first transmission path and the TCP round-trip transmission delay separately and is negatively correlated with the packet loss rate.

Optionally, a size of the congestion window of the sending device is expressed as:

$$Cwnd = \text{Bandwidth of first transmission path} \times RTT \times (1 - \text{Packet loss rate}).$$

Optionally, the application server is further configured to send a congestion window setting message to the sending device, and the congestion window setting message includes the initial value of the congestion window. The sending device is configured to: set a size of the congestion window to the initial value of the congestion window according to an indication of the congestion window setting message, and perform TCP data transmission.

Optionally, when the sending device performs the TCP data transmission, a value of the transmit window is a smaller value between values of the congestion window and the receive window.

Optionally, the TCP transmission resource allocation request further carries maximum transmission unit (MTU) value information, and the MTU value information is used to indicate a maximum value for an MTU value of the sending device and a maximum value for an MTU value of the receiving device. The TCP transmission resource allocation response message further includes the MTU value used by the first transmission path to transmit the data. The application server is further configured to determine that the MTU values of the sending device and the receiving device are the MTU value used by the first transmission path to transmit the data. In this case, the application server is further configured to send an MTU setting message to the sending device and the receiving device, and the MTU setting message includes the MTU value for the first transmission path.

The sending device receives a maximum transmission unit (MTU) setting message, and sets the MTU value of the sending device according to an indication of the MTU setting message.

The receiving device receives a maximum transmission unit MTU setting message, and sets the MTU value of the receiving device according to an indication of the MTU setting message.

Optionally, the controller determines, within a value range indicated by the MTU value information, an optimal MTU value for the first transmission path according to an OAM feature of the first transmission path.

The sending device and the receiving device set MTU values of the devices to the optimal MTU value, such that it can be ensured that data is segmented according to an optimal length, and more effective TCP data transmission is implemented.

Optionally, the application server is further configured to: determine a retransmission timeout interval of the sending device according to the TCP round-trip transmission delay, where the retransmission timeout interval is positively correlated with the TCP round-trip transmission delay; and send a retransmission timeout interval setting message to the sending device, where the retransmission timeout interval setting message includes the retransmission timeout interval.

Optionally, the application server sets the retransmission timeout interval to a round-trip time RTT.

The retransmission timeout interval refers to a maximum wait time during which, after sending a data packet, the sending device waits for an acknowledgment of the data packet to be returned.

Optionally, the application server is further configured to: determine an acknowledgment wait time of the receiving device according to the TCP round-trip transmission delay, where the acknowledgment wait time is positively correlated with the TCP round-trip transmission delay; and send an acknowledgment wait time setting message to the receiving device, where the acknowledgment wait time setting message includes the acknowledgment wait time.

Optionally, the application server sets the acknowledgment wait time to a round-trip time RTT.

The acknowledgment wait time is a maximum wait time during which, after receiving a data packet, the receiving device postpones sending of an acknowledgment.

Specifically, the application server sends the TCP transmission resource allocation request to the controller through the northbound interface of the controller.

Optionally, the application server estimates an expected network bandwidth according to an amount of to-be-transmitted data, a schedule, and features of network interface cards in the sending device and the receiving device, and adds a requested path bandwidth for TCP data transmission to the TCP transmission resource allocation request.

Because a bandwidth for TCP data transmission when packet loss occurs on a path has been reserved, when the third repeated ACK is received at a TCP layer, it indicates that the path is in a congestion phase. The transmit window remains unchanged, and a lost packet is retransmitted.

Because a bandwidth for TCP data transmission when packet loss occurs on a path has been reserved, when timeout occurs, a packet whose ACK is not received is retransmitted, and the transmit window remains unchanged.

According to the technical solution provided in this embodiment, an application server can properly configure parameters for TCP data transmission. When TCP data transmission is required, the application server sends a TCP transmission resource allocation request to a controller through a northbound interface of the controller, and requests a path resource for the TCP data transmission. After the controller configures a path according to the TCP transmission resource allocation request, the application server receives a TCP transmission resource allocation response message sent by the controller. The application server determines the parameters for the TCP data transmission according to the TCP transmission resource allocation response message. A slow start process of TCP is bypassed by setting an initial size of a transmit window for the TCP data transmission. In addition, an initial value of the transmit window is determined according to a bandwidth of a data transmission path and a TCP round-trip time. Therefore, transmission can be performed with a relatively high throughput, and a prior-art problem is avoided that halved oscillation of a sliding window caused by repeated network detection eventually affects a network throughput. An MTU value returned by the controller is used to ensure that data can be segmented according to an optimal length and transmitted on a network device, and more effective TCP data transmission is implemented.

Figure 6:
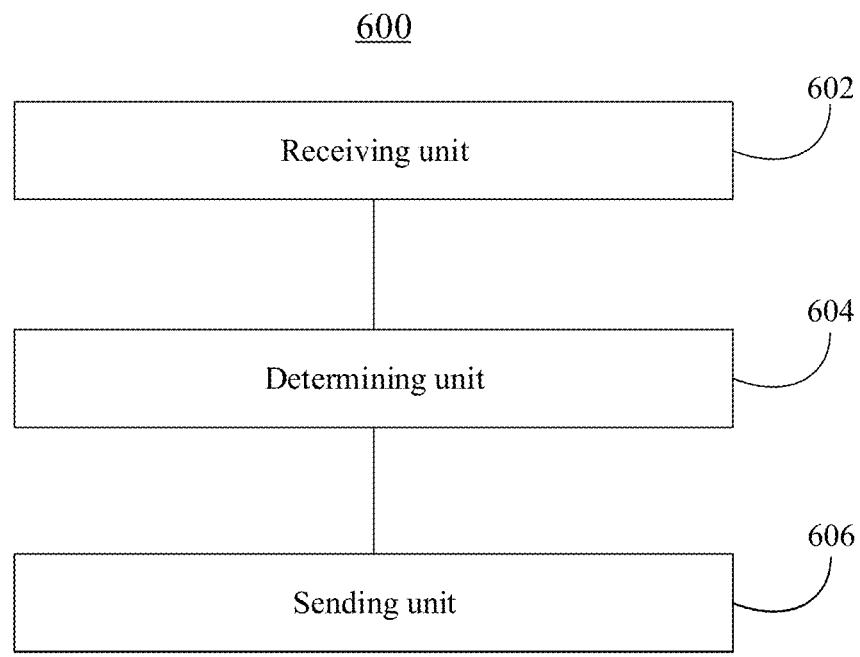
FIG. 6 is a block diagram of a data transmission apparatus according to an embodiment of the present disclosure.

FIG. 6 is a schematic diagram of a data transmission apparatus 600 according to an embodiment of the present disclosure. The apparatus 600 is applied to software-defined networking SDN, is connected to a switching device through a southbound interface, and is connected to an application server through a northbound interface. The application server is configured to control data to be sent from a sending device to a receiving device. As shown in FIG. 6, the data transmission apparatus 600 includes: a receiving unit 602, a determining unit 604, and a sending unit 606.

The receiving unit 602 is configured to receive a TCP transmission resource allocation request from the application server, and the TCP transmission resource allocation request carries an address of the sending device and an address of the receiving device.

The determining unit 604 is configured to determine a first transmission path and a second transmission path according to the TCP transmission resource allocation request. The first transmission path is used by the sending device to transmit the data to the receiving device, and the second transmission path is used by the receiving device to transmit a TCP acknowledgment to the sending device.

The sending unit 606 is configured to send a TCP transmission resource allocation response message to the application server. The TCP transmission resource allocation response message includes bandwidth information of the first transmission path and a TCP round-trip transmission delay. The TCP round-trip transmission delay indicates a pre-estimated time difference between a time T1 at which the sending device sends each data packet through the first transmission path and a time T2 at which the sending device receives a TCP acknowledgment of each data packet through the second transmission path. The bandwidth information of the first transmission path and the TCP round-trip transmission delay are used to determine an initial value of a transmit window for TCP data transmission between the sending device and the receiving device.

The determining unit 604 is further configured to: obtain a transmission delay of the first transmission path and a transmission delay of the second transmission path; and determine the TCP round-trip transmission delay according to the transmission delay of the first transmission path and the transmission delay of the second transmission path. The TCP round-trip transmission delay is positively correlated with a sum of the transmission delay of the first transmission path and the transmission delay of the second transmission path.

Optionally, the determining unit 604 is further configured to determine a packet loss rate of the first transmission path. In this case, the TCP transmission resource allocation response message further includes the packet loss rate of the first transmission path.

Optionally, the TCP transmission resource allocation request further carries maximum transmission unit MTU value information, and the MTU value information includes a maximum value for an MTU value of the sending device and a maximum value for an MTU value of the receiving device. The determining unit 604 is further configured to determine, according to the MTU value information in the TCP transmission resource allocation request, an MTU value used by the first transmission path to transmit the data. The MTU value used by the first transmission path to transmit the data is not greater than a smaller value between the maximum value for the MTU value of the sending device and the maximum value for the MTU value of the receiving device. In this case, the TCP transmission resource allocation response message further includes the MTU value used by the first transmission path to transmit the data.

Optionally, the TCP transmission resource allocation request further includes a bandwidth required for transmitting the data. The determining unit 604 being configured to determine a first transmission path according to the TCP transmission resource allocation request includes: selecting, by the determining unit 604 according to a network topology of the switching device and from paths between the sending device and the receiving device, a path whose remaining bandwidth resources meet a requirement for transmitting the data as the first transmission path.

Specifically, the determining unit 604 being configured to select, from paths between the sending device and the receiving device, a path whose remaining bandwidth resources meet a requirement for transmitting the data as the first transmission path includes: selecting, by the determining unit 604, from all paths whose remaining bandwidth resources meet the requirement for transmitting the data between the sending device and the receiving device, a path whose remaining bandwidth resources are the fewest or a path whose hop count is the smallest as the first transmission path.

The sending unit 606 is further configured to send a bandwidth control message to a switching device on the first transmission path. The bandwidth control message is used to indicate a bandwidth used by the switching device on the first transmission path to transmit the data.

Optionally, the address of the sending device and the address of the receiving device are IP addresses or MAC addresses.

Optionally, the apparatus 600 provides the northbound interface, and provides a function of customizing quality of service of a network path. The application that runs on the application server may access the northbound interface of the controller using a management network.

Optionally, the determining unit 604 selects a set of available paths between the sending device and the receiving device according to the network topology of the switching device, and determines remaining bandwidths of ports of switching devices on the available paths. A bandwidth that has been allocated is subtracted from physical bandwidths of a port to obtain a remaining bandwidth of the port. A smallest value of remaining bandwidths of ports on a path is used as a remaining bandwidth of the path.

Optionally, if all remaining bandwidths of the set of available paths are less than a bandwidth requested by the application server, the determining unit 604 selects a path whose bandwidth is the largest as the first transmission path.

Optionally, the determining unit 604 detects the transmission delay of the first transmission path and the transmission delay of the second transmission path according to operation, administration, and maintenance features of the first transmission path and the second transmission path, and determines the TCP round-trip transmission delay according to the transmission delay of the first transmission path and the transmission delay of the second transmission path. The TCP round-trip transmission delay is positively correlated with the transmission delay of the first transmission path and the transmission delay of the second transmission path separately.

Optionally, the TCP round-trip transmission delay is the sum of the transmission delay of the first transmission path and the transmission delay of the second transmission path.

Optionally, the determining unit 604 further pre-estimates TCP layer processing delays of the sending device and the receiving device. The TCP round-trip transmission delay is a sum of the transmission delay of the first transmission path, the transmission delay of the second transmission path, and the TCP layer processing delays of the sending device and the receiving device.

Optionally, the determining unit 604 further pre-estimates a TCP layer processing delay of the receiving device. The TCP round-trip transmission delay is a sum of the transmission delay of the first transmission path, the transmission delay of the second transmission path, and the TCP layer processing delay of the receiving device.

Optionally, the determining unit 604 collects statistics about the packet loss rate on the first transmission path according to an experience library, adds a reserved packet loss rate, and determines information about the packet loss rate of the first transmission path.

Optionally, the determining unit 604 determines, within a value range indicated by the MTU value information, an optimal MTU value for the first transmission path according to an OAM feature of the first transmission path, such that it can be ensured that data is segmented according to an optimal length, and more effective TCP data transmission is implemented.

Optionally, the sending unit 606 is further configured to separately send a flow entry to a switching device on the first transmission path and a switching device on the second transmission path, to instruct the switching device on the first transmission path to perform TCP data transmission and the switching device on the second transmission path to transmit the TCP acknowledgment.

According to the technical solution provided in this embodiment, the apparatus 600 can properly allocate resources for TCP data transmission. The apparatus 600 receives a TCP transmission resource allocation request from an application server through a northbound interface, properly configures a path and a bandwidth for the TCP data transmission according to the TCP transmission resource allocation request, and determines information such as a TCP round-trip transmission delay of the path, a packet loss rate of the path, and an optimal MTU value of the path. After the path information is returned to the application server side, the application server can properly configure parameters for the TCP data transmission. According to these parameters, the application server can bypass a slow start process of TCP by setting an initial size of a transmit window for the TCP data transmission. In addition, an initial value of the transmit window is determined according to a bandwidth of a data transmission path and a TCP round-trip time. Therefore, transmission can be performed with a relatively high throughput, and a prior-art problem is avoided that halved oscillation of a sliding window caused by repeated network detection eventually affects a network throughput. An MTU value returned by the controller is used to ensure that data can be segmented according to an optimal length and transmitted on a network device, and more effective TCP data transmission is implemented.

Figure 7:
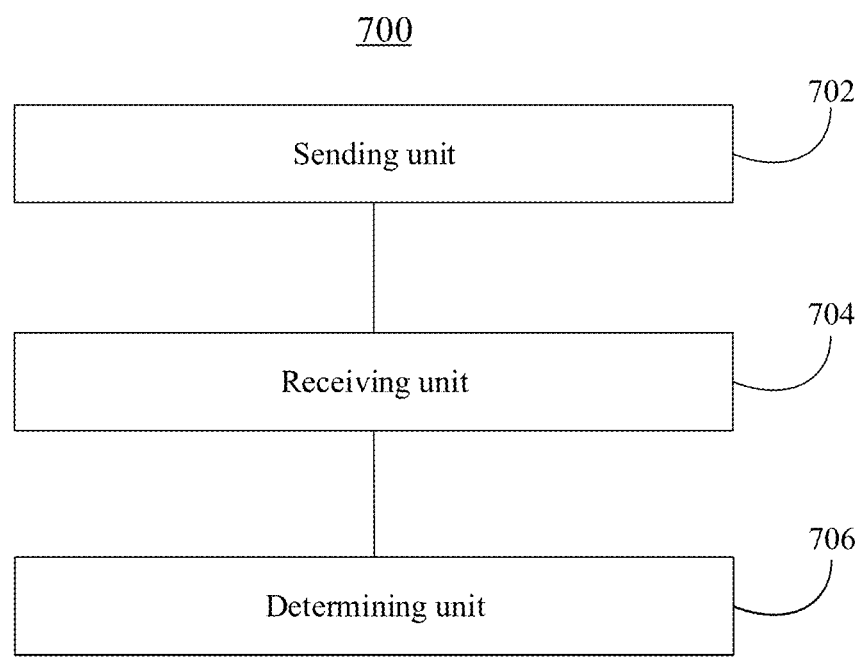
FIG. 7 is a block diagram of a data transmission apparatus according to an embodiment of the present disclosure.

FIG. 7 is a schematic diagram of a data transmission apparatus 700 according to an embodiment of the present disclosure. The apparatus 700 is applied to software-defined networking SDN. A controller in the SDN network is connected to a switching device through a southbound interface, and is connected to the apparatus through a northbound interface. An application runs on the apparatus, and the application is used to control data to be sent from a sending device to a receiving device. As shown in FIG. 7, the data transmission apparatus 700 includes: a sending unit 702, a receiving unit 704, and a determining unit 706.

The sending unit 702 is configured to send a TCP transmission resource allocation request to the controller, and the TCP transmission resource allocation request carries an address of the sending device and an address of the receiving device.

The receiving unit 704 is configured to receive a TCP transmission resource allocation response message from the controller. The TCP transmission resource allocation response message includes a bandwidth of the first transmission path and a TCP round-trip transmission delay. The TCP round-trip transmission delay indicates a pre-estimated time difference between a time T1 at which the sending device sends each data packet through the first transmission path and a time T2 at which the sending device receives a TCP acknowledgment of each data packet through the second transmission path. The first transmission path is used by the sending device to transmit the data to the receiving device, and the second transmission path is used by the receiving device to transmit a TCP acknowledgment to the sending device.

The determining unit 706 is configured to determine, according to the bandwidth of the first transmission path and the TCP round-trip transmission delay, an initial value of a transmit window for TCP data transmission between the sending device and the receiving device. The initial value of the transmit window is positively correlated with the bandwidth of the first transmission path and the TCP round-trip transmission delay separately.

Optionally, the TCP transmission resource allocation response message further carries a packet loss rate of the first transmission path. The determining unit 706 is further configured to determine the initial value of the transmit window according to the packet loss rate. The initial value of the transmit window is positively correlated with the bandwidth of the first transmission path and the TCP round-trip transmission delay separately and is negatively correlated with the packet loss rate.

Optionally, the determining unit 706 is further configured to determine an initial value of a receive window of the receiving device according to the bandwidth of the first transmission path and the TCP round-trip transmission delay. The initial value of the receive window is positively correlated with the bandwidth of the first transmission path and the TCP round-trip transmission delay separately.

Optionally, the determining unit 706 is further configured to determine an initial value of a receive window of the receiving device according to the bandwidth of the first transmission path, the TCP round-trip transmission delay, and the packet loss rate. The initial value of the receive window is positively correlated with the bandwidth of the first transmission path and the TCP round-trip transmission delay separately and is negatively correlated with the packet loss rate.

Specifically, the sending unit 702 is further configured to send a transmit window setting message to the sending device, and the transmit window setting message includes the initial value of the transmit window.

Specifically, the sending unit 702 is further configured to send a receive window setting message to the receiving device, and the receive window setting message includes the initial value of the receive window.

Optionally, the determining unit 706 is further configured to determine an initial value of a congestion window Cwnd of the sending device according to the bandwidth of the first transmission path and the TCP round-trip transmission delay. The initial value of the Cwnd is positively correlated with the bandwidth of the first transmission path and the TCP round-trip transmission delay separately.

Optionally, the determining unit 706 is further configured to determine an initial value of a congestion window Cwnd of the sending device according to the bandwidth of the first transmission path, the TCP round-trip transmission delay, and the packet loss rate. The initial value of the Cwnd is positively correlated with the bandwidth of the first transmission path and the TCP round-trip transmission delay separately and is negatively correlated with the packet loss rate.

Optionally, the sending unit 702 is further configured to send a congestion window setting message to the sending device, and the congestion window setting message includes the initial value of the congestion window. The sending device sets a size of the congestion window to the initial value of the congestion window according to an indication of the congestion window setting message, and performs TCP data transmission.

Optionally, when the sending device performs the TCP data transmission, a value of the transmit window is a smaller value between values of the congestion window and the receive window.

Optionally, the TCP transmission resource allocation request further carries maximum transmission unit (MTU) value information, and the MTU value information is used to indicate a maximum value for an MTU value of the sending device and a maximum value for an MTU value of the receiving device. The TCP transmission resource allocation response message further includes the MTU value used by the first transmission path to transmit the data. The determining unit 706 is further configured to determine that the MTU values of the sending device and the receiving device are the MTU value used by the first transmission path to transmit the data. In this case, the sending unit 702 is further configured to send an MTU setting message to the sending device and the receiving device, and the MTU setting message includes the MTU value for the first transmission path.

Optionally, the determining unit 706 is further configured to determine a retransmission timeout interval of the sending device according to the TCP round-trip transmission delay, and the retransmission timeout interval is positively correlated with the TCP round-trip transmission delay. In this case, the sending unit 702 is further configured to send a retransmission timeout interval setting message to the sending device, and the retransmission timeout interval setting message includes the retransmission timeout interval.

Optionally, the determining unit 706 is further configured to determine an acknowledgment wait time of the receiving device according to the TCP round-trip transmission delay, and the acknowledgment wait time is positively correlated with the TCP round-trip transmission delay. In this case, the sending unit is further configured to send an acknowledgment wait time setting message to the receiving device, and the acknowledgment wait time setting message includes the acknowledgment wait time.

The sending unit 702 sends the TCP transmission resource allocation request to the controller through the northbound interface of the controller.

Optionally, the determining unit 706 first determines a round-trip time RTT between the sending device and the receiving device according to the TCP round-trip transmission delay. The RTT is positively correlated with the TCP round-trip transmission delay.

Optionally, the determining unit 706 determines that the TCP round-trip transmission delay is the round-trip time RTT.

Optionally, the determining unit 706 further pre-estimates TCP layer processing delays of the sending device and the receiving device. The round-trip time RTT is a sum of the TCP round-trip transmission delay and the TCP layer processing delays of the sending device and the receiving device.

Optionally, the determining unit 706 further pre-estimates a TCP layer processing delay of the receiving device. The round-trip time RTT is a sum of the TCP round-trip transmission delay and the TCP layer processing delay of the receiving device.

Optionally, a size of the transmit window of the sending device is expressed as:

Transmit window=Bandwidth of first transmission path×RTT.

Optionally, a size of the receive window of the receiving device is expressed as:

Rwnd=Bandwidth of first transmission path×RTT.

Optionally, a size of the transmit window of the sending device is expressed as:

Transmit window=Bandwidth of first transmission path×RTT×(1−Packet loss rate).

Optionally, a size of the receive window of the receiving device is expressed as:

Rwnd=Bandwidth of first transmission path×RTT× (1−Packet loss rate).

Optionally, the determining unit 706 sets the retransmission timeout interval to a round-trip time RTT.

Optionally, the determining unit 706 sets the acknowledgment wait time to a round-trip time RTT.

Optionally, the determining unit 706 is further configured to determine an initial value of a congestion window Cwnd of the sending device according to the bandwidth of the first transmission path and the TCP round-trip transmission delay. The initial value of the Cwnd is positively correlated with the bandwidth of the first transmission path and the TCP round-trip transmission delay separately.

Optionally, a size of the congestion window of the sending device is expressed as:

Cwnd=Bandwidth of first transmission path×RTT.

Optionally, the determining unit 706 is further configured to determine an initial value of a congestion window Cwnd of the sending device according to the bandwidth of the first transmission path, the TCP round-trip transmission delay, and the packet loss rate. The initial value of the Cwnd is positively correlated with the bandwidth of the first transmission path and the TCP round-trip transmission delay separately and is negatively correlated with the packet loss rate.

Optionally, a size of the congestion window of the sending device is expressed as:

Cwnd=Bandwidth of first transmission path×RTT× (1−Packet loss rate).

Optionally, the sending unit 702 is further configured to send a congestion window setting message to the sending device, and the congestion window setting message includes the initial value of the congestion window. The sending device is configured to: set a size of the congestion window to the initial value of the congestion window according to an indication of the congestion window setting message; and perform TCP data transmission.

Optionally, when the sending device performs the TCP data transmission, a value of the transmit window is a smaller value between values of the congestion window and the receive window.

According to the technical solution provided in this embodiment, the apparatus 700 can properly configure parameters for TCP data transmission. When TCP data transmission is required, the apparatus 700 sends a TCP transmission resource allocation request to a controller through a northbound interface of the controller, and requests a path resource for the TCP data transmission. After the controller configures a path according to the TCP transmission resource allocation request, the apparatus 700 receives a TCP transmission resource allocation response message sent by the controller. The apparatus 700 determines the parameters for the TCP data transmission according to the TCP transmission resource allocation response message. A slow start process of TCP is bypassed by setting an initial size of a transmit window for the TCP data transmission. In addition, an initial value of the transmit window is determined according to a bandwidth of a data transmission path and a TCP round-trip time. Therefore, transmission can be performed with a relatively high throughput, and a prior-art problem is avoided that halved oscillation of a sliding window caused by repeated network detection eventually affects a network throughput. An MTU value returned by the controller is used to ensure that data can be segmented according to an optimal length and transmitted on a network device, and more effective TCP data transmission is implemented.

Figure 8:
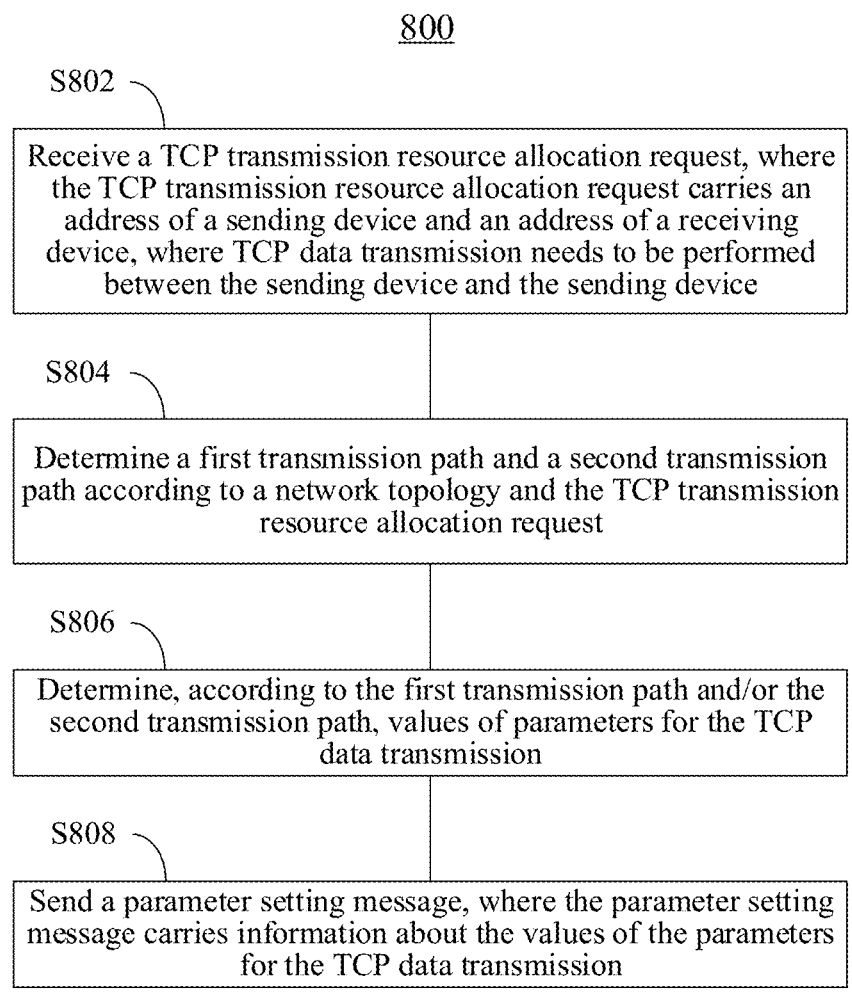
FIG. 8 is a flowchart of a data transmission method according to an embodiment of the present disclosure.

FIG. 8 is a flowchart of an example of a data transmission method 800 according to an embodiment of the present disclosure, so as to implement more effective TCP data transmission. In a specific implementation process, the method is applied to software-defined networking (SDN). A controller in the SDN network is connected to a switching device through a southbound interface and is connected to an application server through a northbound interface. At least one application runs on the application server. The data transmission method 800 may be performed by a controller in an SDN data center. When the application server determines that currently data needs to be transmitted from a sending device to a receiving device using the TCP protocol, as shown in FIG. 8, the method specifically includes the following steps.

S802: The controller receives a TCP transmission resource allocation request from the application server, where the TCP transmission resource allocation request carries an address of the sending device and an address of the receiving device.

S804: The controller determines a first transmission path and a second transmission path according to the TCP transmission resource allocation request, where the first transmission path is used by the sending device to transmit the data to the receiving device, and the second transmission path is used by the receiving device to transmit a TCP acknowledgment to the sending device.

S806: The controller determines, according to the first transmission path and/or the second transmission path, values of parameters used by the sending device and/or the receiving device to perform TCP data transmission.

S808: The controller sends a parameter setting message, where the parameter setting message carries the values of the parameters for the TCP data transmission.

Optionally, the address of the sending device and the address of the receiving device are IP addresses or MAC addresses.

Optionally, the controller provides the northbound interface, and provides a function of customizing quality of service of a network path. The application that runs on the application server may access the northbound interface of the controller using a management network.

Optionally, the controller selects a set of available paths between the sending device and the receiving device according to a network topology of the switching device, and determines remaining bandwidths of ports of switching devices on the available paths. A bandwidth that has been allocated is subtracted from physical bandwidths of a port to obtain a remaining bandwidth of the port. A smallest value of remaining bandwidths of ports on a path is used as a remaining bandwidth of the path.

Optionally, the TCP transmission resource allocation request further includes a bandwidth required for transmitting the data. The determining, by the controller, a first transmission path according to the TCP transmission resource allocation request includes: selecting, according to a network topology of the switching device and from paths between the sending device and the receiving device, a path whose remaining bandwidth resources meet a requirement for transmitting the data and are the fewest as the first transmission path.

Optionally, the determining, by the controller, a first transmission path according to the TCP transmission resource allocation request includes: selecting, according to a network topology of the switching device and from paths between the sending device and the receiving device, a path whose remaining bandwidth resources meet a requirement for transmitting the data and whose hop count is the smallest as the first transmission path.

Optionally, if all remaining bandwidths of the set of available paths are less than a bandwidth requested by the application server, a path whose bandwidth is the largest is selected as the first transmission path.

The controller determines a transmission delay of the first transmission path and a transmission delay of the second transmission path, and determines a TCP round-trip transmission delay according to the transmission delay of the first transmission path and the transmission delay of the second transmission path. The TCP round-trip transmission delay is positively correlated with a sum of the transmission delay of the first transmission path and the transmission delay of the second transmission path.

Optionally, the controller detects the transmission delay of the first transmission path and the transmission delay of the second transmission path according to operation, administration, and maintenance features of the first transmission path and the second transmission path, and determines the TCP round-trip transmission delay according to the transmission delay of the first transmission path and the transmission delay of the second transmission path. The TCP round-trip transmission delay is positively correlated with the transmission delay of the first transmission path and the transmission delay of the second transmission path separately.

Optionally, the TCP round-trip transmission delay is the sum of the transmission delay of the first transmission path and the transmission delay of the second transmission path.

Optionally, the controller further pre-estimates TCP layer processing delays of the sending device and the receiving device. The TCP round-trip transmission delay is a sum of the transmission delay of the first transmission path, the transmission delay of the second transmission path, and the TCP layer processing delays of the sending device and the receiving device.

Optionally, the controller further pre-estimates a TCP layer processing delay of the receiving device. The TCP round-trip transmission delay is a sum of the transmission delay of the first transmission path, the transmission delay of the second transmission path, and the TCP layer processing delay of the receiving device.

The TCP transmission resource allocation request further carries MTU value information, and the MTU value information is used to indicate a maximum value for an MTU value of the sending device and a maximum value for an MTU value of the receiving device. The method 800 further includes: determining, by the controller according to the MTU value information in the TCP transmission resource allocation request, an MTU value used by the first transmission path to transmit the data. The MTU value used by the first transmission path to transmit the data is not greater than a smaller value between the maximum value for the MTU value of the sending device and the maximum value for the MTU value of the receiving device.

Optionally, the controller determines, within a value range indicated by the MTU value information, an optimal MTU value for the first transmission path according to an OAM feature of the first transmission path. The sending a parameter setting message includes: sending MTU value setting information to the sending device and the receiving device.

Optionally, the method 800 further includes separately sending a flow entry to a switching device on the first transmission path and a switching device on the second transmission path, to instruct the switching device on the first transmission path to perform TCP data transmission and the switching device on the second transmission path to transmit the TCP acknowledgment.

Optionally, the method 800 further includes: sending, by the controller, a bandwidth control message to a switching device on the first transmission path. The bandwidth control message is used to indicate a bandwidth used by the switching device on the first transmission path to transmit the data.

Optionally, the determining, by the controller according to the first transmission path and/or the second transmission path, values of parameters for TCP data transmission includes: determining, by the controller, an initial value of a transmit window of the sending device according to a bandwidth of the first transmission path and the TCP round-trip transmission delay. The initial value of the transmit window is positively correlated with the bandwidth of the first transmission path and the TCP round-trip transmission delay separately. In this case, the sending a parameter setting message includes: sending an initial value setting message of the transmit window to the sending device.

Optionally, the controller first determines a round-trip time RTT between the sending device and the receiving device according to the TCP round-trip transmission delay. The RTT is positively correlated with the TCP round-trip transmission delay.

Optionally, it is determined that the TCP round-trip transmission delay is the round-trip time RTT.

Optionally, a size of the transmit window of the sending device is expressed as:

Transmit window=Bandwidth of first transmission path×RTT.

Optionally, the determining, by the controller according to the first transmission path and/or the second transmission path, values of parameters for TCP data transmission includes: determining, by the controller, an initial value of a receive window of the receiving device according to a bandwidth of the first transmission path and the TCP round-trip transmission delay. The initial value of the receive window is positively correlated with the bandwidth of the first transmission path and the TCP round-trip transmission delay separately. In this case, the sending a parameter setting message includes: sending an initial value setting message of the receive window to the receiving device.

Optionally, a size of the receive window of the receiving device is expressed as:

Rwnd=Bandwidth of first transmission path×RTT.

Optionally, the method 800 further includes: determining, by the controller, a packet loss rate of the first transmission path. The packet loss rate is used to indicate a packet loss status when the first transmission path is used for data transmission.

Optionally, the controller collects statistics about the packet loss rate on the first transmission path according to an experience library, adds a reserved packet loss rate, and determines information about the packet loss rate of the first transmission path.

Optionally, the controller enables an OAM feature of the first transmission path, and determines the packet loss rate of the first transmission path.

Optionally, the determining, according to the first transmission path and/or the second transmission path, values of parameters for TCP data transmission includes: determining an initial value of a transmit window of the sending device according to a bandwidth of the first transmission path, the TCP round-trip transmission delay, and the packet loss rate. The initial value of the transmit window is positively correlated with the bandwidth of the first transmission path and the TCP round-trip transmission delay separately and is negatively correlated with the packet loss rate. In this case, the sending a parameter setting message includes: sending an initial value setting message of the transmit window to the sending device.

Optionally, a size of the transmit window of the sending device is expressed as:

Transmit window=Bandwidth of first transmission path×RTT×(1−Packet loss rate).

Optionally, the determining, according to the first transmission path and/or the second transmission path, values of parameters for TCP data transmission includes: determining an initial value of a receive window of the receiving device according to a bandwidth of the first transmission path, the TCP round-trip transmission delay, and the packet loss rate. The initial value of the receive window is positively correlated with the bandwidth of the first transmission path and the TCP round-trip transmission delay separately and is negatively correlated with the packet loss rate. In this case, the sending a parameter setting message includes: sending an initial value setting message of the receive window to the receiving device.

Optionally, a size of the receive window of the receiving device is expressed as:

Rwnd=Bandwidth of first transmission path×RTT×(1−Packet loss rate).

Optionally, the determining, according to the first transmission path and/or the second transmission path, values of parameters for TCP data transmission includes: determining a retransmission timeout interval of the sending device according to the TCP round-trip transmission delay. The retransmission timeout interval is positively correlated with the TCP round-trip transmission delay. In this case, the sending a parameter setting message includes: sending a retransmission timeout interval setting message to the sending device.

Optionally, the controller sets the retransmission timeout interval to a round-trip time RTT.

Optionally, the determining, according to the first transmission path and/or the second transmission path, values of parameters for TCP data transmission includes: determining an acknowledgment wait time of the receiving device according to the TCP round-trip transmission delay. The acknowledgment wait time is positively correlated with the TCP round-trip transmission delay. In this case, the sending a parameter setting message includes: sending an acknowledgment wait time of the receive window to the receiving device.

Optionally, the controller sets the acknowledgment wait time to a round-trip time RTT.

Optionally, the controller is further configured to determine an initial value of a congestion window Cwnd of the sending device according to the bandwidth of the first transmission path and the TCP round-trip transmission delay. The initial value of the Cwnd is positively correlated with the bandwidth of the first transmission path and the TCP round-trip transmission delay separately.

Optionally, a size of the congestion window of the sending device is expressed as:

Cwnd=Bandwidth of first transmission path×RTT.

Optionally, the controller is further configured to determine an initial value of a congestion window Cwnd of the sending device according to the bandwidth of the first transmission path, the TCP round-trip transmission delay, and the packet loss rate. The initial value of the Cwnd is positively correlated with the bandwidth of the first transmission path and the TCP round-trip transmission delay separately and is negatively correlated with the packet loss rate.

Optionally, a size of the congestion window of the sending device is expressed as:

Cwnd=Bandwidth of first transmission path×RTT×(1−Packet loss rate).

Optionally, the controller is further configured to send a congestion window setting message to the sending device, and the congestion window setting message includes the initial value of the congestion window. The sending device is configured to: set a size of the congestion window to the initial value of the congestion window according to an indication of the congestion window setting message, and perform TCP data transmission.

Optionally, when the sending device performs the TCP data transmission, a value of the transmit window is a smaller value between values of the congestion window and the receive window.

According to the technical solution provided in this embodiment, a controller can properly configure resources and parameters for TCP data transmission. The controller receives a TCP transmission resource allocation request from an application server through a northbound interface, properly configures a path and a bandwidth for the TCP data transmission according to the TCP transmission resource allocation request, determines path information such as a TCP round-trip transmission delay of the path, a packet loss rate of the path, and an optimal MTU value of the path, and properly configures parameters for the TCP data transmission according to the path information. According to these parameters, the controller can bypass a slow start process of TCP by setting an initial size of a transmit window for the TCP data transmission. In addition, an initial value of the transmit window is determined according to a bandwidth of a data transmission path and a TCP round-trip time. Therefore, transmission can be performed with a relatively high throughput, and a prior-art problem is avoided that halved oscillation of a sliding window caused by repeated network detection eventually affects a network throughput. An MTU value returned by the controller is used to ensure that data can be segmented according to an optimal length and transmitted on a network device, and more effective TCP data transmission is implemented.

Figure 9:
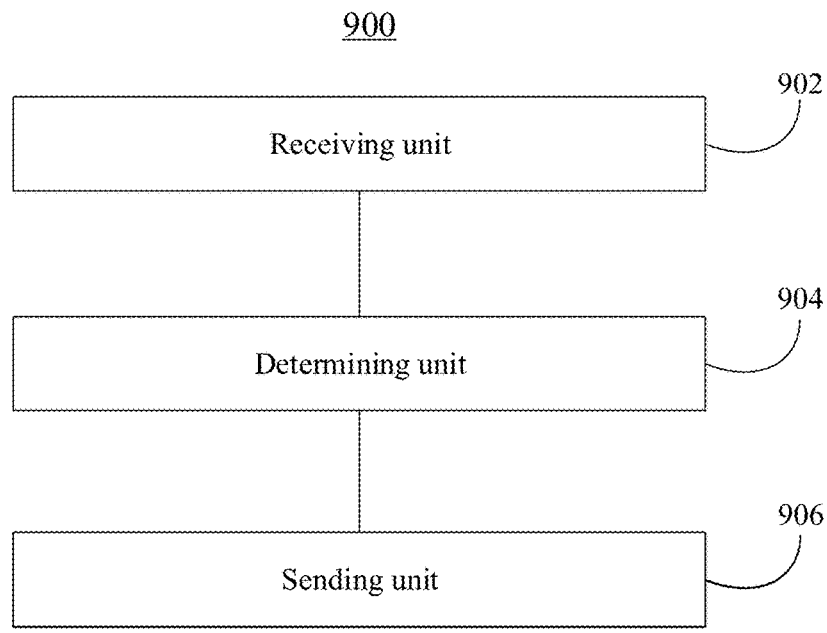
FIG. 9 is a block diagram of a data transmission apparatus according to an embodiment of the present disclosure.

FIG. 9 is a schematic diagram of a data transmission apparatus 900 according to an embodiment of the present disclosure, and the apparatus 900 is applied to software-defined networking SDN. The apparatus 900 is connected to a switching device through a southbound interface, and is connected to an application server through a northbound interface. The application server is configured to control data to be sent from a sending device to a receiving device. As shown in FIG. 9, the data transmission apparatus 900 may include: a receiving unit 902, a determining unit 904, and a sending unit 906.

The receiving unit 902 is configured to receive a TCP transmission resource allocation request from the application server, and the TCP transmission resource allocation request carries an address of the sending device and an address of the receiving device.

The determining unit 904 is configured to: determine a first transmission path and a second transmission path according to the TCP transmission resource allocation request, where the first transmission path is used by the sending device to transmit the data to the receiving device, and the second transmission path is used by the receiving device to transmit a TCP acknowledgment to the sending device; and determine, according to the first transmission path and/or the second transmission path, values of parameters used by the sending device and/or the receiving device to perform TCP data transmission.

The sending unit 906 is configured to send a parameter setting message, and the parameter setting message carries the values of the parameters for the TCP data transmission.

Optionally, the address of the sending device and the address of the receiving device are IP addresses or MAC addresses.

Optionally, the apparatus 900 provides the northbound interface, and provides a function of customizing quality of service of a network path. The application that runs on the application server may access the northbound interface of the controller using a management network.

Optionally, the determining unit 904 is configured to select a set of available paths between the sending device and the receiving device according to a network topology of the switching device, and determines remaining bandwidths of ports of switching devices on the available paths. A bandwidth that has been allocated is subtracted from physical bandwidths of a port to obtain a remaining bandwidth of the port. A smallest value of remaining bandwidths of ports on a path is used as a remaining bandwidth of the path.

Optionally, the TCP transmission resource allocation request further includes a bandwidth required for transmitting the data. The determining unit 904 being configured to determine a first transmission path according to a network topology of the switching device and the TCP transmission resource allocation request includes: selecting, by the determining unit 904 according to the network topology of the switching device and from paths between the sending device and the receiving device, a path whose remaining bandwidth resources meet a requirement for transmitting the data and are the fewest as the first transmission path.

Optionally, the determining unit 904 being configured to determine a first transmission path according to a network topology of the switching device and the TCP transmission resource allocation request includes: selecting, by the determining unit 904 according to the network topology of the switching device and from paths between the sending device and the receiving device, a path whose remaining bandwidth resources meet a requirement for transmitting the data and whose hop count is the smallest as the first transmission path.

Optionally, if all remaining bandwidths of the set of available paths are less than a bandwidth requested by the application server, the determining unit 904 selects a path whose bandwidth is the largest as the first transmission path.

The determining unit 904 determines a transmission delay of the first transmission path and a transmission delay of the second transmission path, and determines the TCP round-trip transmission delay according to the transmission delay of the first transmission path and the transmission delay of the second transmission path. The TCP round-trip transmission delay is positively correlated with a sum of the transmission delay of the first transmission path and the transmission delay of the second transmission path.

Optionally, the determining unit 904 detects the transmission delay of the first transmission path and the transmission delay of the second transmission path according to operation, administration, and maintenance features of the first transmission path and the second transmission path, and determines the TCP round-trip transmission delay according to the transmission delay of the first transmission path and the transmission delay of the second transmission path. The TCP round-trip transmission delay is positively correlated with the transmission delay of the first transmission path and the transmission delay of the second transmission path separately.

Optionally, the TCP round-trip transmission delay is the sum of the transmission delay of the first transmission path and the transmission delay of the second transmission path.

Optionally, the determining unit 904 further pre-estimates TCP layer processing delays of the sending device and the receiving device. The TCP round-trip transmission delay is a sum of the transmission delay of the first transmission path, the transmission delay of the second transmission path, and the TCP layer processing delays of the sending device and the receiving device.

Optionally, the determining unit 904 further pre-estimates a TCP layer processing delay of the receiving device. The TCP round-trip transmission delay is a sum of the transmission delay of the first transmission path, the transmission delay of the second transmission path, and the TCP layer processing delay of the receiving device.

Optionally, the TCP transmission resource allocation request further carries MTU value information, and the MTU value information is used to indicate a maximum value for an MTU value of the sending device and a maximum value for an MTU value of the receiving device. Optionally, the determining unit 904 is further configured to determine, according to the MTU value information in the TCP transmission resource allocation request, an MTU value used by the first transmission path to transmit the data. The MTU value used by the first transmission path to transmit the data is not greater than a smaller value between the maximum value for the MTU value of the sending device and the maximum value for the MTU value of the receiving device.

Optionally, the determining unit 904 determines, within a value range indicated by the MTU value information, an optimal MTU value for the first transmission path according to an OAM feature of the first transmission path. Optionally, the sending unit 906 being configured to send a parameter setting message includes: sending MTU value setting information to the sending device and the receiving device.

Optionally, the sending unit 906 is further configured to separately send a flow entry to a switching device on the first transmission path and a switching device on the second transmission path, to instruct the switching device on the first transmission path to perform TCP data transmission and the switching device on the second transmission path to transmit the TCP acknowledgment.

Optionally, the sending unit 906 is further configured to send a bandwidth control message to a switching device on the first transmission path. The bandwidth control message is used to indicate a bandwidth of a port of the switching device on the first transmission path to perform the TCP data transmission.

Optionally, the determining unit 904 being configured to determine, according to the first transmission path and/or the second transmission path, values of parameters for TCP data transmission includes: determining, by the determining unit 904, an initial value of a transmit window of the sending device according to a bandwidth of the first transmission path and the TCP round-trip transmission delay. The initial value of the transmit window is positively correlated with the bandwidth of the first transmission path and the TCP round-trip transmission delay separately. In this case, the sending unit 906 being configured to send a parameter setting message includes: sending an initial value setting message of the transmit window to the sending device.

Optionally, the determining unit 904 first determines a round-trip time RTT between the sending device and the receiving device according to the TCP round-trip transmission delay. The RTT is positively correlated with the TCP round-trip transmission delay.

Optionally, it is determined that the TCP round-trip transmission delay is the round-trip time RTT.

Optionally, a size of the transmit window of the sending device is expressed as:

Transmit window=Bandwidth of first transmission path×RTT.

Optionally, the determining unit 904 being configured to determine, according to the first transmission path and/or the second transmission path, values of parameters for TCP data transmission includes: determining, by the determining unit 904, an initial value of a receive window of the receiving device according to a bandwidth of the first transmission path and the TCP round-trip transmission delay. The initial value of the receive window is positively correlated with the bandwidth of the first transmission path and the TCP round-trip transmission delay separately. In this case, the sending unit 906 being configured to send a parameter setting message includes: sending an initial value setting message of the receive window to the receiving device.

Optionally, a size of the receive window of the receiving device is expressed as:

Rwnd=Bandwidth of first transmission path×RTT.

Optionally, the determining unit 904 is further configured to determine a packet loss rate of the first transmission path. The packet loss rate is used to indicate a packet loss status when the first transmission path is used for data transmission.

Optionally, the determining unit 904 collects statistics about the packet loss rate on the first transmission path according to an experience library, adds a reserved packet loss rate, and determines the packet loss rate of the first transmission path.

Optionally, the determining unit 904 enables an OAM feature of the first transmission path, and determines the packet loss rate of the first transmission path.

Optionally, the determining unit 904 being configured to determine, according to the first transmission path and/or the second transmission path, values of parameters for TCP data transmission includes: determining, by the determining unit 904, an initial value of a transmit window of the sending device according to a bandwidth of the first transmission path, the TCP round-trip transmission delay, and the packet loss rate. The initial value of the transmit window is positively correlated with the bandwidth of the first transmission path and the TCP round-trip transmission delay separately and is negatively correlated with the packet loss rate. In this case, the sending unit 906 being configured to send a parameter setting message includes: sending an initial value setting message of the transmit window to the sending device.

Optionally, a size of the transmit window of the sending device is expressed as:

Transmit window=Bandwidth of first transmission path×RTT×(1−Packet loss rate).

Optionally, the determining unit 904 being configured to determine, according to the first transmission path and/or the second transmission path, values of parameters for TCP data transmission includes: determining, by the determining unit 904, an initial value of a receive window of the receiving device according to a bandwidth of the first transmission path, the TCP round-trip transmission delay, and the packet loss rate. The initial value of the receive window is positively correlated with the bandwidth of the first transmission path and the TCP round-trip transmission delay separately and is negatively correlated with the packet loss rate. In this case, the sending unit 906 being configured to send a parameter setting message includes: sending an initial value setting message of the receive window to the receiving device.

Optionally, a size of the receive window of the receiving device is expressed as:

Rwnd=Bandwidth of first transmission path×RTT×(1−Packet loss rate).

Optionally, the determining unit 904 being configured to determine, according to the first transmission path and/or the second transmission path, values of parameters for TCP data transmission includes: determining a retransmission timeout interval of the sending device according to the TCP round-trip transmission delay. The retransmission timeout interval is positively correlated with the TCP round-trip transmission delay. In this case, the sending unit 906 being configured to send a parameter setting message includes: sending a retransmission timeout interval setting message to the sending device.

Optionally, the determining unit 904 sets the retransmission timeout interval to a round-trip time RTT.

Optionally, the determining unit 904 being configured to determine, according to the first transmission path and/or the second transmission path, values of parameters for TCP data transmission includes: determining an acknowledgment wait time of the receiving device according to the TCP round-trip transmission delay. The acknowledgment wait time is positively correlated with the TCP round-trip transmission delay. In this case, the sending unit 906 being configured to send a parameter setting message includes: sending an acknowledgment wait time of the receive window to the receiving device.

Optionally, the determining unit 904 sets the acknowledgment wait time to a round-trip time RTT.

Optionally, the determining unit 904 is further configured to determine an initial value of a congestion window Cwnd of the sending device according to the bandwidth of the first transmission path and the TCP round-trip transmission delay. The initial value of the Cwnd is positively correlated with the bandwidth of the first transmission path and the TCP round-trip transmission delay separately.

Optionally, a size of the congestion window of the sending device is expressed as:

Cwnd=Bandwidth of first transmission path×RTT.

Optionally, the determining unit 904 is further configured to determine an initial value of a congestion window Cwnd of the sending device according to the bandwidth of the first transmission path, the TCP round-trip transmission delay, and the packet loss rate. The initial value of the Cwnd is positively correlated with the bandwidth of the first transmission path and the TCP round-trip transmission delay separately and is negatively correlated with the packet loss rate.

Optionally, a size of the congestion window of the sending device is expressed as:

Cwnd=Bandwidth of first transmission path×RTT×
(1−Packet loss rate).

Optionally, the sending unit 906 is further configured to send a congestion window setting message to the sending device, and the congestion window setting message includes the initial value of the congestion window. The sending device is configured to: set a size of the congestion window to the initial value of the congestion window according to an indication of the congestion window setting message; and perform TCP data transmission.

Optionally, when the sending device performs the TCP data transmission, a value of the transmit window is a smaller value between values of the congestion window and the receive window.

According to the technical solution provided in this embodiment, the apparatus 900 can properly configure resources and parameters for TCP data transmission. The apparatus 900 receives a TCP transmission resource allocation request from an application server through a northbound interface, properly configures a path and a bandwidth for the TCP data transmission according to the TCP transmission resource allocation request, determines path information such as a TCP round-trip transmission delay of the path, a packet loss rate of the path, and an optimal MTU value of the path, and properly configures parameters for the TCP data transmission according to the path information. According to these parameters, the apparatus 900 can bypass a slow start process of TCP by setting an initial size of a transmit window for the TCP data transmission. In addition, an initial value of the transmit window is determined according to a bandwidth of a data transmission path and a TCP round-trip time. Therefore, transmission can be performed with a relatively high throughput, and a prior-art problem is avoided that halved oscillation of a sliding window caused by repeated network detection eventually affects a network throughput. An MTU value returned by the controller is used to ensure that data can be segmented according to an optimal length and transmitted on a network device, and more effective TCP data transmission is implemented.

Figure 10:
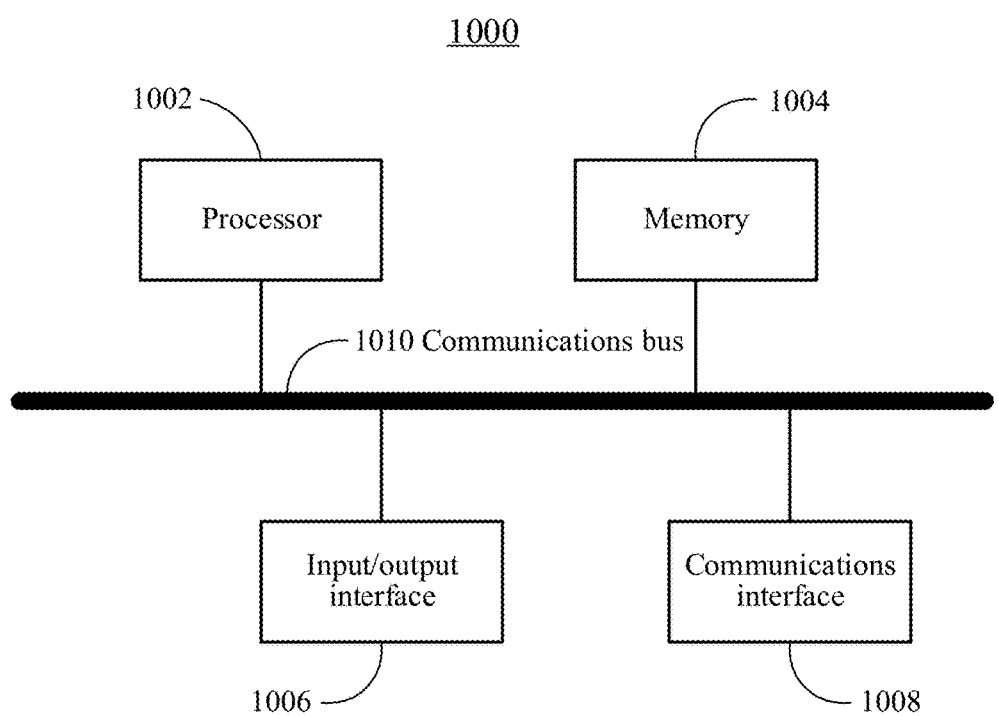
FIG. 10 is a simplified structural diagram of a data transmission apparatus according to an embodiment of the present disclosure.

FIG. 10 is a schematic diagram of a hardware structure of a computing device 1000 according to an embodiment of the present disclosure. As shown in FIG. 10, the computing device 1000 includes a processor 1002, a memory 1004, an input/output interface 1006, a communications interface 1008, and a bus 1010. The processor 1002, the memory 1004, the input/output interface 1006, and the communications interface 1008 are communicatively connected through the bus 1010.

The processor 1002 may be a general-purpose central processing unit (CPU), a microprocessor, an application-specific integrated circuit (ASIC), or one or more integrated circuits, so as to execute a related program, to implement the technical solution provided in this embodiment of the present disclosure.

The memory 1004 may be a read-only memory (ROM), a static storage device, a dynamic storage device, or a random access memory (RAM). The memory 1004 may store an operating system and another application program. When the technical solution provided in this embodiment of the present disclosure is implemented using software or firmware, program code for implementing the technical solution provided in this embodiment of the present disclosure is stored in the memory 1004, and is executed by the processor 1002.

The input/output interface 1006 is configured to: receive data and information that are input, and output data such as an operation result.

The communications interface 1008 uses a transceiving apparatus, for example, but not limited to, a transceiver, to implement communication between the computing device 1000 and another device or a communications network.

The bus 1010 may include a path, for transmitting information between the components (for example, the processor 1002, the memory 1004, the input/output interface 1006, and the communications interface 1008) of the computing device 1000.

It should be noted that, although the computing device 1000 shown in FIG. 10 shows only the processor 1002, the memory 1004, the input/output interface 1006, the communications interface 1008, and the bus 1010, in a specific implementation process, a person skilled in the art should understand that the computing device 1000 further includes other components required for implementing normal running. In addition, according to a specific requirement, a person skilled in the art should understand that the computing device 1000 may further include hardware components for implementing other additional functions. In addition, a person skilled in the art should understand that the computing device 1000 may include only components essential for implementing this embodiment of the present disclosure, but not necessarily include all the components shown in FIG. 10.

The hardware structure shown in FIG. 10 and the foregoing descriptions are applicable to various data transmission devices and systems provided in the embodiments of the present disclosure, and are applicable to implementation of various data transmission methods provided in the embodiments of the present disclosure.

In the several embodiments provided in this application, it should be understood that the disclosed system, apparatus, and method may be implemented in other manners. For example, the described apparatus embodiment is merely an example. For example, the module division is merely logical function division and may be other division in implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The software functional module is stored in a storage medium and includes several instructions for instructing a computing device (which may be a personal computer, a server, or a network device) to perform some of the steps of the methods described in the embodiments of the present disclosure. The foregoing storage medium includes: any medium that can store program code such as a USB flash drive, a removable hard disk, a read-only memory, a random access memory, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for transmitting data in a software-defined networking (SDN) environment using transmission control protocol (TCP), comprising:
    receiving, by a controller, a transmission resource allocation request from a server, wherein the transmission resource allocation request carries an address of a sending device and an address of a receiving device;
    determining, by the controller, a first transmission path, a packet loss rate of the first transmission path, and a second transmission path according to the transmission resource allocation request, wherein the first transmission path is used by the sending device to transmit data to the receiving device, and the second transmission path is used by the receiving device to transmit an acknowledgment to the sending device; and
    sending, by the controller, a transmission resource allocation response to the server, wherein the transmission resource allocation response comprises bandwidth information of the first transmission path, the packet loss rate of the first transmission path and a round-trip transmission delay, wherein the bandwidth information of the first transmission path, the packet loss rate of the first transmission path and the round-trip transmission delay are used by the server to determine an initial value of a transmit window for data transmission between the sending device and the receiving device.

2. The method according to claim 1, wherein the transmission resource allocation request further comprises a requested bandwidth for transmitting the data; and
    wherein determining the first transmission path according to the transmission resource allocation request comprises:
    selecting, by the controller according to a network topology of a switching device and from paths between the sending device and the receiving device, a path whose remaining bandwidth resources meet a requirement for transmitting the data as the first transmission path.

3. A method for transmitting data in a software-defined networking (SDN) environment using transmission control protocol (TCP), comprising:
    sending, by a server, a transmission resource allocation request to a controller, wherein the transmission resource allocation request carries an address of a sending device and an address of a receiving device;
    receiving, by the server, a transmission resource allocation response from the controller, wherein the transmission resource allocation response comprises a bandwidth of a first transmission path, a packet loss rate of the first transmission path and a round-trip transmission delay, wherein the first transmission path is used by the sending device to transmit data to the receiving device; and
    determining, by the server, an initial value of a transmit window for transmitting data from the sending device to the receiving device according to the bandwidth of the first transmission path, the round-trip transmission delay, and the packet loss rate.

4. The method according to claim 3, further comprising:
    determining, by the server according to the transmission resource allocation response, an initial value of a receive window for receiving the data by the receiving device.

5. The method according to claim 4, wherein
    the initial value of the receive window is determined according to the bandwidth of the first transmission path, the round-trip transmission delay, and the packet loss rate.

6. The method according to claim 4, further comprising:
    sending, by the server, a receive window setting message to the receiving device, wherein the receive window setting message comprises the initial value of the receive window.

7. The method according to claim 3, further comprising:
    sending, by the server, a transmit window setting message to the sending device, wherein the transmit window setting message comprises the initial value of the transmit window.

8. A controller for controlling data transmission in a software-defined networking (SDN) environment using transmission control protocol (TCP), comprising:
    a memory configured to store program instructions;
    a networking interface; and
    a processor coupled to the memory,
    wherein, by executing the program instructions, the processor is configured to:
    receive, through the networking interface, a transmission resource allocation request from a server, wherein the transmission resource allocation request carries an address of a sending device and an address of a receiving device;
    determine a first transmission path, a packet loss rate of the first transmission path and a second transmission path according to the transmission resource allocation request, wherein the first transmission path is used by the sending device to transmit data to the receiving device, and the second transmission path is used by the receiving device to transmit an acknowledgment to the sending device; and
    send, through the networking interface, a transmission resource allocation response to the server, wherein the transmission resource allocation response comprises bandwidth information of the first transmission path, the packet loss rate of the first transmission path and a round-trip transmission delay, wherein the bandwidth information of the first transmission path and the round-trip transmission delay are used by the server to determine an initial value of a transmit window for data transmission between the sending device and the receiving device.

9. The controller according to claim 8, wherein the transmission resource allocation request further comprises a requested bandwidth for transmitting the data; and wherein in determining the first transmission path according to the transmission resource allocation request, the processor is configured to:
select, according to a network topology of a switching device and from paths between the sending device and the receiving device, a path whose remaining bandwidth resources meet a requirement for transmitting the data as the first transmission path.

10. A server in a software-defined networking (SDN) environment using transmission control protocol (TCP), comprising:
a memory configured to store program instructions;
a networking interface; and
a processor coupled to the memory,
wherein, by executing the program instructions, the processor is configured to:
send, through the networking interface, a transmission resource allocation request to a controller, wherein the transmission resource allocation request carries an address of a sending device and an address of a receiving device;
receive, through the networking interface, a transmission resource allocation response from the controller, wherein the transmission resource allocation response comprises a bandwidth of a first transmission path, a packet loss rate of the first transmission path and a round-trip transmission delay, wherein the first transmission path is used by the sending device to transmit data to the receiving device; and
determine, an initial value of a transmit window for transmitting data from the sending device to the receiving device according to the bandwidth of the first transmission path, the round-trip transmission delay, and the packet loss rate.

11. The server according to claim 10, wherein the processor, by executing the program instructions, is further configured to:
determine, according to the transmission resource allocation response, an initial value of a receive window for receiving the data by the receiving device.

12. The server according to claim 11, wherein
the initial value of the receive window is determined according to the bandwidth of the first transmission path, the round-trip transmission delay, and the packet loss rate.

13. The server according to claim 11, wherein the processor, by executing the program instructions, is further configured to:
send, through the networking interface, a receive window setting message to the receiving device, wherein the receive window setting message comprises the initial value of the receive window.

14. The server according to claim 10, wherein the processor, by executing the program instructions, is further configured to:
send, through the networking interface, a transmit window setting message to the sending device, wherein the transmit window setting message comprises the initial value of the transmit window.

15. A system in a software-defined networking (SDN) environment using transmission control protocol (TCP), comprising:
a server, a controller, a sending device, a receiving device, and one or more switching devices connecting the sending device and the receiving device;
wherein the server is configured to:
send a transmission resource allocation request to the controller, wherein the transmission resource allocation request carries an address of the sending device and an address of the receiving device;
the controller is configured to:
determine a first transmission path, a packet loss rate of the first transmission path, and a second transmission path between the sending device and the receiving device according to the transmission resource allocation request, wherein the first transmission path is used by the sending device to transmit data to the receiving device, and the second transmission path is used by the receiving device to transmit an acknowledgment to the sending device; and
send a transmission resource allocation response to the server, wherein the transmission resource allocation response comprises bandwidth information of the first transmission path, the packet loss rate of the first transmission path, and a round-trip transmission delay;
the server is further configured to:
determine an initial value of a transmit window for transmitting data from the sending device to the receiving device according to the bandwidth information of the first transmission path, the round-trip transmission delay, and the packet loss rate; and
send a transmit window setting message to the sending device, wherein the transmit window setting message comprises the initial value of the transmit window; and
the sending device is configured to:
set a size of the transmit window to the initial value of the transmit window according to the transmit window setting message; and
transmitting the data to the receiving device according to the transmit window.

16. The system of claim 15, wherein the size of the transmit window is determined by the following expression:

$$\text{size of the transmit window} = BW \times RTT,$$

wherein BW is a bandwidth of the first transmission path, and RTT is the round-trip transmission delay.

17. The system of claim 15, wherein the size of the transmit window is determined by the following expression:

$$\text{size of the transmit window} = BW \times RTT \times (1 - \text{Packet Loss Rate}),$$

wherein BW is a bandwidth of the first transmission path, RTT is the round-trip transmission delay, and Packet Loss Rate is the packet loss rate of the first transmission path.

* * * * *